(12) United States Patent
Burba, III et al.

(10) Patent No.: US 8,066,874 B2
(45) Date of Patent: Nov. 29, 2011

(54) APPARATUS FOR TREATING A FLOW OF AN AQUEOUS SOLUTION CONTAINING ARSENIC

(75) Inventors: John L. Burba, III, Parker, CO (US); Carl R. Hassler, Gig Harbor, WA (US); C. Brock O'Kelley, Las Vegas, NV (US); Joseph A. Lupo, Las Vegas, NV (US); Joseph R. Pascoe, Las Vegas, NV (US)

(73) Assignee: Molycorp Minerals, LLC, Greenwood Village, CO (US)

( * ) Notice: Subject to any disclaimer, the term of this patent is extended or adjusted under 35 U.S.C. 154(b) by 389 days.

(21) Appl. No.: 11/932,837

(22) Filed: Oct. 31, 2007

(65) Prior Publication Data

US 2008/0156734 A1    Jul. 3, 2008

Related U.S. Application Data

(60) Provisional application No. 60/882,365, filed on Dec. 28, 2006, provisional application No. 60/882,376, filed on Dec. 28, 2006, provisional application No. 60/882,401, filed on Dec. 28, 2006.

(51) Int. Cl.
*C02F 1/58* (2006.01)
*C02F 101/10* (2006.01)

(52) U.S. Cl. ........ 210/181; 210/186; 210/203; 210/209; 210/266; 210/282; 210/284; 210/290; 210/911

(58) Field of Classification Search .................... 210/181
See application file for complete search history.

(56) References Cited

U.S. PATENT DOCUMENTS

| | | | |
|---|---|---|---|
| 1,739,840 | A | 12/1929 | Kendall |
| 2,564,241 | A | 8/1951 | Warf |
| 2,567,661 | A | 9/1951 | Ayres |
| 2,847,332 | A | 8/1958 | Ramadanoff |
| 2,872,286 | A | 2/1959 | Finzel |
| 3,194,629 | A | 7/1965 | Dreibelbis et al. |
| 3,259,568 | A | 7/1966 | Jordan et al. |
| 3,337,452 | A | 8/1967 | Teske et al. |

(Continued)

FOREIGN PATENT DOCUMENTS

CA    2396510    2/2003

(Continued)

OTHER PUBLICATIONS

U.S. Appl. No. 11/793,895, filed May 9, 2008, Boen et al.

(Continued)

*Primary Examiner* — Peter A Hruskoci
(74) *Attorney, Agent, or Firm* — Sheridan Ross P.C.

(57) ABSTRACT

An apparatus for treating an aqueous solution containing arsenic. The apparatus comprises a container that includes a housing, an inlet located at a first end of the housing and an outlet located at a second end opposite the first end. An outer wall extends between the first and second ends and enclosing a fluid flow path between the inlet and the outlet and an arsenic fixing agent is disposed in the fluid flow path. The arsenic fixing agent can include an insoluble rare earth-containing compound, more specifically, a compound comprising one or more of cerium, lanthanum, or praseodymium. The inlet and the outlet are adapted to be closed during transport and storage. The container is adapted to be sealed for long term disposal after exposure to an aqueous solution containing arsenic.

25 Claims, 3 Drawing Sheets

U.S. PATENT DOCUMENTS

| | | | |
|---|---|---|---|
| 3,347,786 A | 10/1967 | Baer et al. | |
| 3,385,915 A | 5/1968 | Hamling | |
| 3,575,853 A | 4/1971 | Gaughan et al. | |
| 3,617,569 A | 11/1971 | Daniels et al. | |
| 3,658,724 A | 4/1972 | Stiles | |
| 3,692,671 A | 9/1972 | Recht et al. | |
| 3,736,255 A | 5/1973 | Ghassemi et al. | |
| 3,761,571 A | 9/1973 | Woodhead | |
| 3,768,989 A | 10/1973 | Goetzinger et al. | |
| 3,838,759 A | 10/1974 | Schmoelz et al. | |
| 3,849,537 A | 11/1974 | Allgulin | |
| 3,865,728 A | 2/1975 | Abbott et al. | |
| 3,916,585 A | 11/1975 | Barks | |
| 3,926,807 A * | 12/1975 | Evers et al. | 210/177 |
| 3,956,118 A | 5/1976 | Kleber et al. | |
| 3,965,118 A | 6/1976 | Van Rheenen | |
| 4,001,375 A | 1/1977 | Longo | |
| 4,046,687 A | 9/1977 | Schulze | |
| 4,054,516 A | 10/1977 | Izumi et al. | |
| 4,059,520 A * | 11/1977 | Roller | 210/184 |
| 4,078,058 A | 3/1978 | Fox, Jr. | |
| 4,088,754 A | 5/1978 | Monafo | |
| 4,094,777 A | 6/1978 | Sugier et al. | |
| 4,096,064 A | 6/1978 | Du Fresne | |
| 4,101,631 A | 7/1978 | Ambrosini et al. | |
| 4,127,644 A | 11/1978 | Norman et al. | |
| 4,145,282 A | 3/1979 | Bruckenstein | |
| 4,200,609 A | 4/1980 | Byrd | |
| 4,230,682 A | 10/1980 | Bamberger | |
| 4,231,893 A | 11/1980 | Woodhead | |
| 4,251,496 A | 2/1981 | Longo et al. | |
| 4,313,925 A | 2/1982 | Bamberger | |
| 4,346,063 A | 8/1982 | Cahn et al. | |
| 4,386,063 A | 5/1983 | Boden | |
| 4,404,197 A | 9/1983 | Fox et al. | |
| 4,436,655 A * | 3/1984 | Masotti et al. | 588/3 |
| 4,474,580 A | 10/1984 | MacKenzie et al. | |
| 4,474,896 A | 10/1984 | Chao | |
| 4,477,315 A | 10/1984 | Tomaszewski | |
| 4,498,706 A | 2/1985 | Ilardi et al. | |
| 4,507,206 A | 3/1985 | Hughes | |
| 4,566,975 A | 1/1986 | Allgulin | |
| 4,581,229 A | 4/1986 | Petrow | |
| 4,585,583 A * | 4/1986 | Roberson et al. | 588/8 |
| 4,588,088 A * | 5/1986 | Allen | 206/525 |
| 4,596,659 A | 6/1986 | Nomura et al. | |
| 4,622,149 A | 11/1986 | Devuyst et al. | |
| 4,636,289 A | 1/1987 | Mani et al. | |
| 4,652,054 A | 3/1987 | Copenhafer et al. | |
| 4,661,330 A | 4/1987 | Chane-Ching et al. | |
| 4,714,694 A | 12/1987 | Wan et al. | |
| 4,738,799 A * | 4/1988 | Troy | 588/15 |
| 4,753,728 A | 6/1988 | VanderBilt et al. | |
| 4,786,483 A | 11/1988 | Audeh | |
| 4,814,152 A | 3/1989 | Yan | |
| 4,818,483 A | 4/1989 | Culling | |
| 4,828,832 A | 5/1989 | De Cuellar et al. | |
| 4,831,519 A | 5/1989 | Morton | |
| 4,842,898 A | 6/1989 | Gradeff | |
| 4,843,102 A | 6/1989 | Horton | |
| 4,849,223 A | 7/1989 | Pratt | |
| 4,859,432 A | 8/1989 | David et al. | |
| 4,861,519 A | 8/1989 | Tusa et al. | |
| 4,881,176 A | 11/1989 | Kononov | |
| 4,881,976 A | 11/1989 | Gradeff | |
| 4,889,771 A | 12/1989 | Gradeff et al. | |
| 4,891,067 A | 1/1990 | Rappas et al. | |
| 4,902,426 A | 2/1990 | Macedo et al. | |
| 4,917,875 A | 4/1990 | Moore et al. | |
| 4,920,195 A | 4/1990 | Kankare et al. | |
| 4,935,146 A | 6/1990 | O'Neill et al. | |
| 4,946,592 A | 8/1990 | Galaj et al. | |
| 4,968,322 A | 11/1990 | Miyawaki et al. | |
| 4,973,501 A | 11/1990 | Gradeff | |
| 4,997,425 A | 3/1991 | Shioya et al. | |
| 4,999,174 A | 3/1991 | Wilson et al. | |
| 5,004,711 A | 4/1991 | Grodek | |
| 5,013,534 A | 5/1991 | Dissaux et al. | |
| 5,024,769 A | 6/1991 | Gallup | |
| 5,028,736 A | 7/1991 | Girrbach et al. | |
| 5,043,072 A | 8/1991 | Hitotsuyanagi et al. | |
| 5,053,139 A | 10/1991 | Dodwell et al. | |
| 5,061,560 A | 10/1991 | Tajima et al. | |
| 5,064,628 A | 11/1991 | Chane-Ching et al. | |
| 5,066,758 A | 11/1991 | Honel et al. | |
| 5,080,926 A | 1/1992 | Porter et al. | |
| 5,082,570 A | 1/1992 | Higgins et al. | |
| 5,104,660 A | 4/1992 | Chvapil et al. | |
| 5,116,418 A | 5/1992 | Kaliski | |
| 5,116,620 A | 5/1992 | Chvapil et al. | |
| 5,126,116 A | 6/1992 | Krause et al. | |
| 5,133,948 A | 7/1992 | King et al. | |
| 5,145,587 A | 9/1992 | Ishii et al. | |
| 5,152,936 A | 10/1992 | Tajima et al. | |
| 5,161,385 A | 11/1992 | Schumacher | |
| 5,178,768 A | 1/1993 | White, Jr. et al. | |
| 5,192,452 A | 3/1993 | Mitsui et al. | |
| 5,207,877 A | 5/1993 | Weinberg et al. | |
| 5,207,995 A | 5/1993 | Bosserman | |
| 5,213,779 A | 5/1993 | Kay et al. | |
| 5,227,168 A | 7/1993 | Chvapil et al. | |
| 5,236,595 A | 8/1993 | Wang et al. | |
| 5,238,488 A | 8/1993 | Wilhelm | |
| 5,248,398 A | 9/1993 | Cordani | |
| 5,260,066 A | 11/1993 | Wood et al. | |
| 5,281,253 A | 1/1994 | Thompson | |
| 5,326,737 A | 7/1994 | Kay et al. | |
| 5,328,669 A | 7/1994 | Han et al. | |
| 5,330,770 A | 7/1994 | Kuno | |
| 5,338,460 A | 8/1994 | Yen | |
| 5,344,479 A | 9/1994 | Kerfoot et al. | |
| 5,352,365 A | 10/1994 | Fuller | |
| 5,356,437 A | 10/1994 | Pedersen et al. | |
| 5,358,643 A | 10/1994 | McClintock | |
| 5,368,703 A | 11/1994 | Brewster | |
| 5,389,352 A | 2/1995 | Wang | |
| 5,403,495 A | 4/1995 | Kust et al. | |
| 5,409,522 A | 4/1995 | Durham et al. | |
| 5,422,489 A | 6/1995 | Bhargava | |
| 5,422,907 A | 6/1995 | Bhargava | |
| 5,433,931 A | 7/1995 | Bosserman | |
| 5,446,286 A | 8/1995 | Bhargava | |
| 5,455,489 A | 10/1995 | Bhargava | |
| 5,500,198 A | 3/1996 | Liu et al. | |
| 5,505,766 A | 4/1996 | Chang | |
| 5,529,811 A | 6/1996 | Sinko | |
| 5,545,604 A | 8/1996 | Demmel | |
| 5,551,976 A * | 9/1996 | Allen | 588/250 |
| 5,556,545 A | 9/1996 | Volchek et al. | |
| 5,575,915 A | 11/1996 | Nakamura et al. | |
| 5,575,919 A | 11/1996 | Santina | |
| 5,580,535 A | 12/1996 | Hoke et al. | |
| 5,603,838 A | 2/1997 | Misra et al. | |
| 5,611,934 A | 3/1997 | Shepperd, III et al. | |
| 5,618,406 A | 4/1997 | Demmel | |
| 5,637,258 A | 6/1997 | Goldburt et al. | |
| 5,649,894 A | 7/1997 | White et al. | |
| 5,660,802 A | 8/1997 | Archer et al. | |
| 5,683,953 A | 11/1997 | Mills | |
| 5,688,378 A | 11/1997 | Khoe et al. | |
| 5,689,038 A | 11/1997 | Bartram et al. | |
| 5,698,212 A | 12/1997 | Hagiwara | |
| 5,702,592 A | 12/1997 | Suri et al. | |
| 5,711,930 A | 1/1998 | Albers et al. | |
| 5,712,218 A | 1/1998 | Chopin et al. | |
| 5,712,219 A | 1/1998 | Klabunde et al. | |
| 5,728,404 A | 3/1998 | Von Rheinbaben et al. | |
| 5,730,995 A | 3/1998 | Shirono et al. | |
| 5,759,855 A | 6/1998 | Pierschbacher et al. | |
| 5,759,939 A | 6/1998 | Klabunde et al. | |
| 5,783,057 A | 7/1998 | Tomita et al. | |
| 5,795,836 A | 8/1998 | Jin et al. | |
| 5,820,966 A | 10/1998 | Krause et al. | |
| 5,833,841 A | 11/1998 | Koslowsky | |
| 5,859,064 A | 1/1999 | Cronce | |
| 5,876,610 A | 3/1999 | Clack et al. | |
| 5,897,675 A | 4/1999 | Mangold et al. | |

| Patent No. | Date | Inventor |
|---|---|---|
| 5,897,781 A | 4/1999 | Dourdeville |
| 5,897,784 A | 4/1999 | Mills |
| 5,910,253 A | 6/1999 | Fuerstenau et al. |
| 5,914,287 A | 6/1999 | Saito |
| 5,914,436 A | 6/1999 | Klabunde et al. |
| 5,918,555 A | 7/1999 | Winegar |
| 5,922,926 A | 7/1999 | Back et al. |
| 5,928,504 A | 7/1999 | Hembre et al. |
| 5,938,837 A | 8/1999 | Hanawa et al. |
| 5,939,087 A | 8/1999 | Hagiwara |
| 5,952,665 A | 9/1999 | Bhargava |
| 5,976,383 A | 11/1999 | Guess et al. |
| 5,990,373 A | 11/1999 | Klabunde |
| 5,994,260 A | 11/1999 | Bonneau |
| 6,001,152 A | 12/1999 | Sinha |
| 6,001,157 A | 12/1999 | Nogami |
| 6,017,553 A | 1/2000 | Burrell et al. |
| 6,030,537 A | 2/2000 | Shaniuk et al. |
| 6,036,886 A | 3/2000 | Chhabra et al. |
| 6,045,925 A | 4/2000 | Klabunde et al. |
| 6,048,821 A | 4/2000 | Demmel et al. |
| 6,057,488 A | 5/2000 | Koper et al. |
| 6,087,294 A | 7/2000 | Klabunde et al. |
| 6,093,236 A | 7/2000 | Klabunde et al. |
| 6,093,325 A | 7/2000 | Stone |
| 6,093,328 A | 7/2000 | Santina |
| 6,099,819 A | 8/2000 | Srinivas et al. |
| 6,114,038 A | 9/2000 | Castro et al. |
| 6,132,623 A | 10/2000 | Nikolaidis et al. |
| 6,136,749 A | 10/2000 | Gadkaree et al. |
| 6,143,318 A | 11/2000 | Gilchrist et al. |
| 6,146,539 A | 11/2000 | Mills |
| 6,177,015 B1 | 1/2001 | Blakey et al. |
| 6,180,016 B1 | 1/2001 | Johnston et al. |
| 6,187,192 B1 | 2/2001 | Johnston et al. |
| 6,187,205 B1 | 2/2001 | Martin et al. |
| 6,197,201 B1 | 3/2001 | Misra et al. |
| 6,197,204 B1 | 3/2001 | Heskett |
| 6,200,482 B1 | 3/2001 | Winchester et al. |
| 6,203,709 B1 | 3/2001 | Min et al. |
| 6,214,238 B1 | 4/2001 | Gallup |
| 6,221,118 B1 | 4/2001 | Yoshida et al. |
| 6,221,602 B1 | 4/2001 | Barbera-Guillem et al. |
| 6,221,903 B1 | 4/2001 | Courchesne |
| 6,224,898 B1 | 5/2001 | Balogh et al. |
| 6,238,566 B1 | 5/2001 | Yoshida et al. |
| 6,238,686 B1 | 5/2001 | Burrell et al. |
| 6,248,605 B1 | 6/2001 | Harkonen et al. |
| 6,258,334 B1 | 7/2001 | Gadkaree et al. |
| 6,264,841 B1 | 7/2001 | Tudor |
| 6,294,006 B1 | 9/2001 | Andou |
| 6,299,851 B1 | 10/2001 | Li et al. |
| 6,300,640 B1 | 10/2001 | Bhargava et al. |
| 6,312,604 B1 | 11/2001 | Denkewicz et al. |
| 6,319,108 B1 | 11/2001 | Adefris et al. |
| 6,326,326 B1 | 12/2001 | Feng et al. |
| 6,328,779 B1 | 12/2001 | He et al. |
| 6,338,800 B1 | 1/2002 | Kulperger et al. |
| 6,341,567 B1 | 1/2002 | Robertson et al. |
| 6,342,163 B1 * | 1/2002 | DeLonge et al. ............ 210/749 |
| 6,350,383 B1 | 2/2002 | Douglas |
| 6,351,932 B1 | 3/2002 | Hummel |
| 6,361,824 B1 | 3/2002 | Yekimov et al. |
| 6,368,510 B2 | 4/2002 | Friot |
| 6,372,003 B1 | 4/2002 | Kasai et al. |
| 6,375,834 B1 | 4/2002 | Guess et al. |
| 6,383,273 B1 | 5/2002 | Kepner et al. |
| 6,383,395 B1 * | 5/2002 | Clarke et al. ............. 210/683 |
| 6,391,207 B1 | 5/2002 | Cluyse |
| 6,391,869 B1 | 5/2002 | Parks et al. |
| 6,395,659 B2 | 5/2002 | Seto et al. |
| 6,395,736 B1 | 5/2002 | Parks et al. |
| 6,403,653 B1 | 6/2002 | Hobson et al. |
| 6,406,676 B1 | 6/2002 | Sundkvist |
| 6,410,603 B1 | 6/2002 | Hobson et al. |
| 6,417,423 B1 | 7/2002 | Koper et al. |
| 6,420,434 B1 | 7/2002 | Braue et al. |
| 6,428,705 B1 | 8/2002 | Allen et al. |
| 6,440,300 B1 | 8/2002 | Randall et al. |
| 6,444,143 B2 | 9/2002 | Bawendi et al. |
| 6,452,184 B1 | 9/2002 | Taskar et al. |
| 6,460,535 B1 | 10/2002 | Nisewander et al. |
| 6,461,535 B1 | 10/2002 | de Esparza |
| 6,468,499 B1 | 10/2002 | Balachandran et al. |
| 6,475,451 B1 | 11/2002 | Leppin et al. |
| 6,524,487 B2 | 2/2003 | Kulperger et al. |
| 6,524,540 B1 | 2/2003 | Heinig |
| 6,528,451 B2 | 3/2003 | Brezny et al. |
| 6,536,672 B1 | 3/2003 | Outwater |
| 6,537,382 B1 | 3/2003 | Bartram et al. |
| 6,542,487 B1 | 4/2003 | Ishii et al. |
| 6,542,540 B1 | 4/2003 | Leung et al. |
| 6,551,514 B1 | 4/2003 | Misra et al. |
| 6,562,092 B1 | 5/2003 | Ito et al. |
| 6,562,403 B2 | 5/2003 | Klabunde et al. |
| 6,569,224 B2 | 5/2003 | Kerfoot et al. |
| 6,569,393 B1 | 5/2003 | Hoke et al. |
| 6,569,490 B2 | 5/2003 | Yadav et al. |
| 6,572,672 B2 | 6/2003 | Yadav et al. |
| 6,576,092 B2 | 6/2003 | Granite et al. |
| 6,585,787 B2 | 7/2003 | Yamasaki et al. |
| 6,589,496 B1 | 7/2003 | Yabe et al. |
| 6,599,428 B1 | 7/2003 | Douglas |
| 6,599,429 B1 | 7/2003 | Azizian |
| 6,602,111 B1 | 8/2003 | Fujie et al. |
| 6,602,671 B1 | 8/2003 | Bawendi et al. |
| 6,610,264 B1 | 8/2003 | Buchanan et al. |
| 6,613,230 B2 | 9/2003 | Krulik et al. |
| 6,623,642 B2 | 9/2003 | Robertson |
| 6,627,632 B2 | 9/2003 | Parks et al. |
| 6,653,519 B2 | 11/2003 | Koper et al. |
| 6,666,903 B1 | 12/2003 | Green |
| 6,680,211 B2 | 1/2004 | Barbera-Guillem et al. |
| 6,689,178 B2 | 2/2004 | Ito et al. |
| 6,706,082 B2 | 3/2004 | Ota et al. |
| 6,706,195 B2 | 3/2004 | Jensen et al. |
| 6,716,895 B1 | 4/2004 | Terry |
| 6,719,828 B1 | 4/2004 | Lovell et al. |
| 6,723,349 B1 | 4/2004 | Hill et al. |
| 6,740,141 B2 | 5/2004 | Espin et al. |
| 6,770,483 B2 | 8/2004 | Lyon |
| 6,774,361 B2 | 8/2004 | Bawendi et al. |
| 6,780,332 B2 | 8/2004 | Shiau et al. |
| 6,790,363 B2 | 9/2004 | Vempati |
| 6,790,420 B2 | 9/2004 | Breen et al. |
| 6,790,521 B1 | 9/2004 | Taketomi et al. |
| 6,800,204 B2 | 10/2004 | Harck et al. |
| 6,808,692 B2 | 10/2004 | Oehr |
| 6,821,414 B1 * | 11/2004 | Johnson et al. ............ 210/97 |
| 6,821,434 B1 | 11/2004 | Moore et al. |
| 6,824,690 B1 | 11/2004 | Zhao et al. |
| 6,827,766 B2 | 12/2004 | Carnes et al. |
| 6,833,123 B2 | 12/2004 | Huang et al. |
| 6,843,617 B2 | 1/2005 | Chowdhury et al. |
| 6,843,919 B2 | 1/2005 | Klabunde et al. |
| 6,843,923 B2 | 1/2005 | Morton |
| 6,846,432 B2 | 1/2005 | Mills |
| 6,849,187 B2 | 2/2005 | Shaniuk |
| 6,852,903 B1 | 2/2005 | Brown et al. |
| 6,855,665 B1 | 2/2005 | Blake et al. |
| 6,858,147 B2 | 2/2005 | Dukhin et al. |
| 6,860,924 B2 | 3/2005 | Rajagopalan et al. |
| 6,861,002 B2 * | 3/2005 | Hughes ............ 210/681 |
| 6,862,825 B1 | 3/2005 | Lowndes |
| 6,863,825 B2 | 3/2005 | Witham et al. |
| 6,864,213 B2 | 3/2005 | LaBarge et al. |
| 6,881,424 B1 | 4/2005 | Kemp et al. |
| 6,881,766 B2 | 4/2005 | Hain |
| 6,883,825 B2 | 4/2005 | Schneider |
| 6,887,302 B2 | 5/2005 | Rajagopalan et al. |
| 6,887,566 B1 | 5/2005 | Hung et al. |
| 6,896,809 B2 | 5/2005 | Qian et al. |
| 6,901,684 B2 | 6/2005 | Ito et al. |
| 6,905,527 B2 | 6/2005 | Ito et al. |
| 6,905,698 B1 | 6/2005 | Aldcroft et al. |
| 6,908,560 B2 | 6/2005 | Guter |
| 6,908,570 B2 | 6/2005 | Green |
| 6,908,628 B2 | 6/2005 | Herruzo Cabrera |

| | | |
|---|---|---|
| 6,914,033 B2 | 7/2005 | Gislason et al. |
| 6,914,034 B2 | 7/2005 | Vo |
| 6,919,029 B2 | 7/2005 | Meng et al. |
| 6,921,739 B2 | 7/2005 | Smith et al. |
| 6,927,501 B2 | 8/2005 | Baarman et al. |
| 6,942,840 B1 | 9/2005 | Broderick |
| 6,946,076 B2 | 9/2005 | Mills |
| 6,946,578 B2 | 9/2005 | Nakano et al. |
| 6,957,743 B2 | 10/2005 | Johnston et al. |
| 6,960,329 B2 | 11/2005 | Sellakumar |
| 6,974,564 B2 | 12/2005 | Biermann et al. |
| 6,977,039 B2 * | 12/2005 | Knoll et al. .................. 210/232 |
| 6,986,798 B2 | 1/2006 | Bessho et al. |
| 6,987,129 B2 | 1/2006 | Mak et al. |
| 6,998,080 B2 | 2/2006 | Stadermann et al. |
| 7,008,559 B2 | 3/2006 | Chen |
| 7,014,782 B2 | 3/2006 | D'Emidio et al. |
| 7,025,800 B2 | 4/2006 | Campbell et al. |
| 7,029,516 B2 | 4/2006 | Campbell et al. |
| 7,033,419 B1 | 4/2006 | Granite et al. |
| RE39,098 E | 5/2006 | Klabunde et al. |
| 7,037,480 B2 | 5/2006 | Bhinde |
| 7,048,853 B2 | 5/2006 | Witham et al. |
| 7,048,860 B2 | 5/2006 | Oishi |
| 7,049,382 B2 | 5/2006 | Haftka et al. |
| 7,056,454 B2 | 6/2006 | Fujino |
| 7,060,233 B1 | 6/2006 | Srinivas et al. |
| 7,067,294 B2 | 6/2006 | Singh et al. |
| 7,074,336 B1 | 7/2006 | Teter et al. |
| 7,078,071 B2 | 7/2006 | Taketomi et al. |
| 7,081,428 B1 | 7/2006 | Thampi |
| 7,083,730 B2 | 8/2006 | Davis |
| 7,094,383 B2 | 8/2006 | Wang et al. |
| 7,101,415 B2 | 9/2006 | Torres et al. |
| 7,101,493 B2 | 9/2006 | Colucci |
| 7,112,237 B2 | 9/2006 | Zeller et al. |
| 7,129,684 B2 | 10/2006 | Park |
| 7,141,227 B2 | 11/2006 | Chan |
| 7,156,888 B2 | 1/2007 | Mochizuki |
| 7,156,994 B1 * | 1/2007 | Archer ........................... 210/266 |
| 7,160,505 B2 | 1/2007 | Belbachir et al. |
| 7,179,849 B2 | 2/2007 | Terry |
| 7,183,235 B2 | 2/2007 | Lovell et al. |
| 7,186,671 B2 | 3/2007 | Smith et al. |
| 7,192,602 B2 | 3/2007 | Fechner et al. |
| 7,211,320 B1 | 5/2007 | Cooper et al. |
| 7,214,836 B2 | 5/2007 | Brown et al. |
| 7,241,629 B2 | 7/2007 | Dejneka et al. |
| 7,250,174 B2 | 7/2007 | Lee et al. |
| 7,252,694 B2 | 8/2007 | Woo et al. |
| 7,252,769 B2 | 8/2007 | Dickinson |
| 7,256,049 B2 | 8/2007 | Bennett et al. |
| 7,276,640 B2 | 10/2007 | Mulukutla et al. |
| 7,279,129 B2 | 10/2007 | Lanz et al. |
| 7,282,153 B2 | 10/2007 | Barrett et al. |
| 7,291,272 B2 | 11/2007 | Bourke et al. |
| 7,291,315 B2 | 11/2007 | Obee et al. |
| 7,297,263 B2 | 11/2007 | Nelson et al. |
| 7,300,587 B2 | 11/2007 | Smith et al. |
| 7,300,589 B2 | 11/2007 | Witham et al. |
| 7,311,842 B2 | 12/2007 | Kim et al. |
| 7,329,356 B2 | 2/2008 | Brady |
| 7,329,359 B2 | 2/2008 | Roark |
| 7,335,622 B2 | 2/2008 | Koyanaka et al. |
| 7,335,808 B2 | 2/2008 | Koper et al. |
| 7,338,603 B1 | 3/2008 | McNew et al. |
| 7,341,618 B2 | 3/2008 | Bayer et al. |
| 7,341,667 B2 | 3/2008 | Kennard et al. |
| 7,341,977 B2 | 3/2008 | Klabunde et al. |
| 7,361,279 B2 | 4/2008 | Hernandez |
| 7,368,388 B2 | 5/2008 | Small et al. |
| 7,368,412 B2 | 5/2008 | Tranter et al. |
| 7,378,372 B2 | 5/2008 | Sylvester |
| 7,422,759 B2 | 9/2008 | Kepner et al. |
| 7,429,330 B2 | 9/2008 | Vo et al. |
| 7,431,758 B2 | 10/2008 | Ota et al. |
| 7,438,828 B2 | 10/2008 | Young |
| 7,445,718 B2 | 11/2008 | Misra et al. |
| 7,459,086 B2 | 12/2008 | Gaid |
| 7,468,413 B2 | 12/2008 | Yokota et al. |
| 7,473,474 B2 | 1/2009 | Toreki et al. |
| 7,476,311 B2 | 1/2009 | Litz et al. |
| 7,481,939 B2 | 1/2009 | Haley |
| 7,498,005 B2 | 3/2009 | Yadav |
| 7,534,287 B2 | 5/2009 | Zeller et al. |
| 7,534,453 B1 | 5/2009 | Rzigalinski et al. |
| 7,560,023 B2 | 7/2009 | Miyazawa et al. |
| 7,566,393 B2 | 7/2009 | Klabunde et al. |
| 7,572,416 B2 | 8/2009 | Alward et al. |
| 7,588,744 B1 | 9/2009 | Sylvester |
| 7,588,782 B2 | 9/2009 | Moerck et al. |
| 7,591,952 B2 | 9/2009 | Young |
| 7,611,620 B2 | 11/2009 | Carson et al. |
| 7,645,540 B2 | 1/2010 | Boone et al. |
| 7,661,483 B2 | 2/2010 | Mulukutla et al. |
| 7,820,100 B2 | 10/2010 | Garfield et al. |
| 2001/0009831 A1 | 7/2001 | Schink et al. |
| 2001/0012856 A1 | 8/2001 | Parks et al. |
| 2002/0003116 A1 | 1/2002 | Golden |
| 2002/0005382 A1 | 1/2002 | Kulperger et al. |
| 2002/0044901 A1 | 4/2002 | Wilson et al. |
| 2002/0066702 A1 | 6/2002 | Liu |
| 2002/0072522 A1 | 6/2002 | Parks et al. |
| 2002/0187990 A1 | 12/2002 | Parks et al. |
| 2002/0198136 A1 | 12/2002 | Mak et al. |
| 2003/0015467 A1 | 1/2003 | Johnston et al. |
| 2003/0133990 A1 | 7/2003 | Hursey et al. |
| 2003/0149406 A1 | 8/2003 | Martineau et al. |
| 2003/0156981 A1 | 8/2003 | Mills |
| 2003/0180213 A1 | 9/2003 | Carnes et al. |
| 2003/0203977 A1 | 10/2003 | Klabunde et al. |
| 2003/0207949 A1 | 11/2003 | Klabunde et al. |
| 2003/0215378 A1 | 11/2003 | Zhou et al. |
| 2004/0029715 A1 | 2/2004 | Schindler et al. |
| 2004/0031764 A1 | 2/2004 | Heinig |
| 2004/0043914 A1 | 3/2004 | Kaziska et al. |
| 2004/0050795 A1 | 3/2004 | Park et al. |
| 2004/0091417 A1 | 5/2004 | Yadav |
| 2004/0104377 A1 | 6/2004 | Phelps et al. |
| 2004/0202703 A1 | 10/2004 | Meyer-Ingold et al. |
| 2004/0230086 A1 | 11/2004 | Okun et al. |
| 2005/0058689 A1 | 3/2005 | McDaniel |
| 2005/0067347 A1 | 3/2005 | Vanhulle et al. |
| 2005/0069464 A1 | 3/2005 | Obee et al. |
| 2005/0079415 A1 | 4/2005 | Boone et al. |
| 2005/0084755 A1 | 4/2005 | Boone et al. |
| 2005/0098503 A1 | 5/2005 | Kim |
| 2005/0126338 A1 | 6/2005 | Yadav |
| 2005/0126430 A1 | 6/2005 | Lightner, Jr. et al. |
| 2005/0136486 A1 | 6/2005 | Haushalter |
| 2005/0159307 A1 | 7/2005 | Okun et al. |
| 2005/0230659 A1 | 10/2005 | Hampden-Smith et al. |
| 2005/0257724 A1 | 11/2005 | Guinther et al. |
| 2005/0271941 A1 | 12/2005 | Bushong et al. |
| 2006/0000763 A1 | 1/2006 | Rinker et al. |
| 2006/0018954 A1 | 1/2006 | Kuttler |
| 2006/0030622 A1 | 2/2006 | Mak et al. |
| 2006/0049091 A1 | 3/2006 | Cheetham et al. |
| 2006/0070947 A1 | 4/2006 | Conrad |
| 2006/0120930 A1 | 6/2006 | Mizukami |
| 2006/0178609 A1 | 8/2006 | Horn et al. |
| 2006/0198883 A1 | 9/2006 | Parks et al. |
| 2006/0199301 A1 | 9/2006 | Basheer et al. |
| 2006/0199733 A1 | 9/2006 | Grier et al. |
| 2006/0224237 A1 | 10/2006 | Furst et al. |
| 2006/0228275 A1 | 10/2006 | Rutman |
| 2006/0237369 A1 | 10/2006 | Kirts et al. |
| 2006/0246149 A1 | 11/2006 | Buchholz et al. |
| 2006/0254930 A1 | 11/2006 | Martinie et al. |
| 2006/0257728 A1 | 11/2006 | Mortensen et al. |
| 2006/0275564 A1 | 12/2006 | Grah et al. |
| 2007/0000836 A1 | 1/2007 | Elefritz et al. |
| 2007/0012631 A1 | 1/2007 | Coffey et al. |
| 2007/0017871 A1 | 1/2007 | Reddy et al. |
| 2007/0080115 A1 | 4/2007 | Sylvester |
| 2007/0081931 A1 | 4/2007 | Cho et al. |
| 2007/0114179 A1 | 5/2007 | Badger |
| 2007/0122327 A1 | 5/2007 | Yang et al. |

| | | | | | |
|---|---|---|---|---|---|
| 2007/0128424 | A1 | 6/2007 | Omori et al. | JP | 2005-288363 | 10/2005 |
| 2007/0134307 | A1 | 6/2007 | Xiao et al. | JP | 2006-320847 | 11/2006 |
| 2007/0142783 | A1 | 6/2007 | Huey et al. | JP | 2006/320847 | 11/2006 |
| 2007/0149405 | A1 | 6/2007 | Spitler et al. | JP | 07/081932 | 3/2007 |
| 2007/0158251 | A1 | 7/2007 | Chau | JP | 2010-083741 | 4/2010 |
| 2007/0167971 | A1 | 7/2007 | Huey et al. | RU | 2136607 | 9/1999 |
| 2007/0169626 | A1 | 7/2007 | Sullivan | RU | 2178529 | 1/2002 |
| 2007/0286796 | A1 | 12/2007 | Koper et al. | SU | 663291 | 5/1979 |
| 2007/0298085 | A1 | 12/2007 | Lestage et al. | SU | 1766848 | 10/1992 |
| 2008/0050440 | A1 | 2/2008 | Wakamura et al. | WO | WO 95/11195 | 4/1995 |
| 2008/0058206 | A1 | 3/2008 | Misra et al. | WO | WO 97/12672 | 4/1997 |
| 2008/0058689 | A1 | 3/2008 | Holloway et al. | WO | WO 98/07493 | 2/1998 |
| 2008/0081120 | A1 | 4/2008 | Van Ooij et al. | WO | WO 99/28239 | 6/1999 |
| 2008/0090138 | A1 | 4/2008 | Vu et al. | WO | WO 00/24680 | 5/2000 |
| 2008/0093580 | A1 | 4/2008 | Witham et al. | WO | WO 01/32799 | 5/2001 |
| 2008/0097271 | A1 | 4/2008 | Lo et al. | WO | WO 01/32820 | 5/2001 |
| 2008/0102136 | A1 | 5/2008 | Koper et al. | WO | WO 01/78506 | 10/2001 |
| 2008/0199539 | A1 | 8/2008 | Baker et al. | WO | WO 03/092748 | 11/2003 |
| 2008/0254146 | A1 | 10/2008 | Huey et al. | WO | WO 2004/076770 | 9/2004 |
| 2008/0254147 | A1 | 10/2008 | Huey et al. | WO | 2004096433 A1 | 11/2004 |
| 2008/0262285 | A1 | 10/2008 | Black et al. | WO | WO 2005/028707 | 3/2005 |
| 2008/0264300 | A1 | 10/2008 | Sato et al. | WO | WO 2005/042130 | 5/2005 |
| 2008/0302267 | A1 | 12/2008 | Defalco | WO | WO 2005/056175 | 6/2005 |
| 2008/0311311 | A1 | 12/2008 | Khan et al. | WO | WO 2005/075000 | 8/2005 |
| 2009/0001011 | A1 | 1/2009 | Knipmeyer et al. | WO | WO 2005/081722 | 9/2005 |
| 2009/0011240 | A1 | 1/2009 | Lenz et al. | WO | 2006/011764 | 2/2006 |
| 2009/0011930 | A1 | 1/2009 | Hagemeyer | WO | WO 2006/011764 | 2/2006 |
| 2009/0012204 | A1 | 1/2009 | Drechsler et al. | WO | WO 2006/044784 | 4/2006 |
| 2009/0069844 | A1 | 3/2009 | Green et al. | WO | WO 2006/047613 | 5/2006 |
| 2009/0098016 | A1 | 4/2009 | Koper et al. | WO | WO 2006/070153 | 7/2006 |
| 2009/0101588 | A1 | 4/2009 | Misra et al. | WO | WO 2006/102008 | 9/2006 |
| 2009/0101837 | A1 | 4/2009 | Kourtakis et al. | WO | WO 2006/117424 | 11/2006 |
| 2009/0107919 | A1 | 4/2009 | Burba et al. | WO | WO 2007/011877 | 1/2007 |
| 2009/0107925 | A1 | 4/2009 | Burba et al. | WO | WO 2007/041553 | 4/2007 |
| 2009/0108777 | A1 | 4/2009 | Hyde et al. | WO | WO 2007/120910 | 10/2007 |
| 2009/0111289 | A1 | 4/2009 | Vinther | WO | WO 2008/151173 | 12/2008 |
| 2009/0111689 | A1 | 4/2009 | Burba, III et al. | WO | WO 2009/064845 | 5/2009 |
| 2009/0120802 | A1 | 5/2009 | Ciampi et al. | WO | WO 2009/142823 | 11/2009 |
| 2009/0122043 | A1 | 5/2009 | Burba, III et al. | WO | WO 2010/010569 | 1/2010 |
| 2009/0130169 | A1 | 5/2009 | Bernstein | WO | WO 2010/010570 | 1/2010 |
| 2009/0206042 | A1 | 8/2009 | Landau et al. | WO | WO 2010/010571 | 1/2010 |
| 2009/0264574 | A1 | 10/2009 | Van Ooij et al. | WO | WO 2010/010574 | 1/2010 |
| 2009/0299253 | A1 | 12/2009 | Hursey | WO | WO 2010/019934 | 2/2010 |
| 2010/0042206 | A1 | 2/2010 | Yadav et al. | | | |
| 2010/0055456 | A1 | 3/2010 | Perera et al. | | | |

FOREIGN PATENT DOCUMENTS

| | | |
|---|---|---|
| CN | 1248486 | 3/2000 |
| EP | 0191893 | 8/1986 |
| EP | 0541158 | 5/1993 |
| EP | 0939431 | 1/1999 |
| EP | 1201607 | 2/2002 |
| EP | 1080144 | 8/2002 |
| EP | 1452229 | 9/2004 |
| EP | 1071500 | 2/2005 |
| EP | 1870150 | 12/2007 |
| EP | 2161067 | 3/2010 |
| EP | 2177252 | 4/2010 |
| GB | 2426469 | 11/2006 |
| JP | 11/51917 | 6/1989 |
| JP | H2-17220 | 4/1990 |
| JP | 10165948 | 6/1998 |
| JP | 11/090413 | 4/1999 |
| JP | 11/302684 | 11/1999 |
| JP | 11-302684 | 11/1999 |
| JP | 2000/024647 | 1/2000 |
| JP | 2000-024647 | 1/2000 |
| JP | 2002/205062 | 7/2002 |
| JP | 2002-282686 | 10/2002 |
| JP | 2002/349234 | 12/2002 |
| JP | 2004/050069 | 2/2004 |
| JP | 2004/057870 | 2/2004 |
| JP | 2004/305915 | 11/2004 |
| JP | 2004/330012 | 11/2004 |
| JP | 2005-023373 | 1/2005 |
| JP | 2005-028312 | 2/2005 |
| JP | 2005/028312 | 2/2005 |
| JP | 2005/048181 | 2/2005 |
| JP | 2005-288363 | 10/2005 |

OTHER PUBLICATIONS

U.S. Appl. No. 12/610,569, filed Nov. 2, 2009, Witham et al.
U.S. Appl. No. 12/616,653, filed Nov. 11, 2009, Burba et al.
U.S. Appl. No. 12/632,523, filed Dec. 7, 2009, Witham.
Abanades et al., "Thermochemical hydrogen production from a two-step solar-driven water-splitting cycle based on cerium oxides." Solar Energy 80 (2006) 1611-1623.
Adschiri et al., "Hydrothermal Synthesis of Metal Oxide Fine Particles at Supercritical Conditions," Ind. Eng. Chem. Res. 2000, 39, 4901-4907.
Casey, "Mystery Ceramic could lead to cheaper, stronger hydrogen fuel cells," gas2.0, Oct. 12, 2009, available at http://gas2.org/2009/10/12/mystery-ceramic-could-lead-to-cheaper-stronger-solid-... 3 pages.
Hakuta et al., "Production of ultra-fine ceria particles by hydrothermal synthesis under supercritical conditions," Jouranl of Materials Science Letters 17 (1998) 1211-1213.
Kozlova et al., "Overall water splitting over Pt/TiO2 catalyst with Ce3+/Ce4+ shuttle charge transfer system," International Journal of Hydrogen Energy 34 (2009) 138-146.
Kreh et al., "Selective Oxidations with Ceric Methanesulfonate and Ceric Trifluoromethanesulfonate" Tetrahedron Letters, vol. 28, No. 10, pp. 1067-1068, 1987.
Lemont et al., "Promising optimization of the CeO2/CeCl3 cycle by reductive dissolution of cerium(IV) oxide," International Journal of Hydrogen Energy 33 (2008) 7355-7360.
Romero et al., "Syntheses, Crystal Structures, and Characterization of Bismuth Phosphates," Inorg. Chem. 1994, 33, 1869-1874.
Singh et al., "Ce0.67Cr0.33O2.11: A New Low-Temperature O2 Evolution Material and H2 Generation Catalyst by Thermochemical Splitting of Water†" Chem. Matter. 2009, 7 pages.

Spiro et al., "Heterogeneous Catalysis in Solution. Part II. The Effect of Platinum on Oxidation-Reduction Reactions," pp. 78-96, date unknown.

Spotnitz et al., "Mediated electropynthesis with cerium (IV) in methanesulphonic acid," Journal of Applied Electrochemistry 20 (1990) 209-215.

Viricelle et al., "Transformation of cerium(III) hydroxycarbonate into ceria. Part 1—Nucleation and growth rates of ceria," J. Chem. Soc., Faraday Trans., 1995, 91, 4431-4435.

Paulenova et al., "Redox potentials and kinetics of the Ce3+/Ce4+ redox reaction and solubility of cerium sulfates in sulfuric acid solutions," Journal of Power Sources 109 (2002) 431-438.

Zhang, Y., Yang, M., and Huang, X., Arsenic(V) removal with a Ce(IV)-doped iron oxide adsorbent, Chemosphere 51 (2003) 945-952.

U.S. Appl. No. 11/958,602, filed Dec. 18, 2007, Burba et al.
U.S. Appl. No. 11/958,644, filed Dec. 18, 2007, Burba et al.
U.S. Appl. No. 11/958,968, filed Dec. 18, 2007, Burba et al.

"Bastnasite", available at http://webmineral.com/data/Bastnasite-(Ce).shtml, accessed Jul. 30, 2007, 6 pages.

"Carbonates", available on the Molycorp website Dec. 13, 2005, pp. 22-30.

"Cerium: A Guide to its role in Chemical Technology", Molycorp, 1992, 48 pages.

"Clear Choices for Clean Drinking Water", Consumer Reports Jan. 2003, pp. 33-37.

"Foul Release System and Drag", Proceedins of the PCE 2001 Conference, pp. 273-286, Antwerp, 12 pages.

"Homogeneous Reactions of As and Se Oxoanions in Aqueous Solutions, and the Photooxidation of their Reduced Species in the X-ray Beam", available at http://geoweb.princeton.edu/research/geochemistry/research/aqueous-oxoanion.html, accessed May 6, 2009.

"Hydrometallurgy", Hazen Research, Inc., available at http://www.hazenusa.com/hydrometallurgy-1.php, accessed Dec. 21, 2006, 7 pages.

"Potentiometry", date unknown, 14 pages.

"The Bacteriostatic Activity of Cerium, Lanthanum, and Thallium", Burkes et al., Journal of Bateriology, 54:417-24 (1947).

"UI Arsenic water treatment project shows promise", University of Idaho, Environmental News Network, Dec. 3, 2002, 2 pages.

Ahmed et al., "Arsenic Mitigation in Bangladesh", Oct. 2002, 67 pages.

Ahmed et al., "Arsenic Mitigation Technologies in South and East Asia", 44 pages, date unknown.

Ahmed, "Water Supply Options", available at http://www.physics.harvard.edu/~wilson/arsenic/conferences/Feroze_Ahmed/Sec_3 . . ., accessed May 8, 2009, 25 pages, Jan. 29, 2002.

Ahmed, M. Feroze, "An Overview of Arsenic Removal Technologies in Bangladesh and India," Buet-Unu International Workshop on Technologies for Arsenic Removal from Drinking Water, May 5-7, 2001, pp. 251-269.

Ali et al., "Fate of Arsenic in Wastes Generated from Arsenic Removal Units", Bangladesh University of Engineering and Technology, date unknown, pp. 147-159.

Amimono, "Arsenic removal by inorganic ion-exchanger", available at http://www.apec-vc.or.jp/e/modules/tinyd00/index.php?id=63&kh_open_cid_00=7, accessed May 8, 2009.

Arsenate, Wikipedia, available at http://en.wikipedia.org/w/index.php?title=Arsenate&printable=yes, accessed May 6, 2009, 2 pages.

Banu et al., "Fabrication of Diffaction-encoded micro-particles using nano-imprint lithography", J. Micromech. Microeng. 17 (2007) S116-S121.

Chambers et al., "Modern approaches to marine antifouling coatings", Surface & Coatings Technology 201 (2006) 3642-3652.

Chi et al., "Preparation of Enriched Cerium Oxide from Bastnasite with Hydrochloric Acid by Two-Step Leaching", Metallurgical and Materials Transactions B, vol. 37B, Apr. 2006-155.

ClearWater Filtration Systems, Press Release, "New Filtration Patent to Revolutionize Home Water Filtration: Arsenic Levels Can Now be Controlled".

Clifford et al., "Oxidizing Arsenic III to Arsenic V for Better Removal", Water & Wastes Digest, Water Quality Products, Mar. 2001, vol. 6, No. 3, available at http://www.wwdmag.com/Oxidizing-Arsenic-III-to-Arsenic-V-for-Better-Removal- . . ., accessed May 6, 2009, 2 pages.

Corvini et al., "Mercury Removal from Natural Gas and Liquid Streams", UOP LLC, 11 pages, date unknown.

Dejneka et al., "Rare earth-doped glass microbarcodes", PNAS, Jan. 21, 2003, vol. 100, No. 2, 389-393.

Emsley, "The Elements" Third Edition, 1998, pp. 22-23, 26-27, 54-55, 110-111.

Everett et al., "Study of the Uncatalyzed Oxidation of Arsenic(III) by Cerium(IV) in Perchloric Acid Medium", Jan. 10, 1971, Stanford University.

Fujikawa et al., "Simulteneous removal of arsenic, iron and manganese in biological treatment unit", available at http://www.apec-vc.or.jp/e/modules/tinyd00/index.php?id=65&kh_open_cid_00=7, accessed May 8, 2009, 3 pages.

Fujikawa et al., "The aim of this special edition", Kyoto University, available at http://www.apec-vc.or.jp/e/modules/tinyd00/index.php?id=61&kh_open_cid_00=7, accessed May 8, 2009.

Goldberg, "Competitive Adsorption of Arsenate and Arsenite on Oxides and Clay Minerals", Soil Sci. Soc. Am. J. 66:413-421 (2002).

Gordon, "Network Progress: An Update from the Secretariat", World Health Organization: International Network to Promote Household Water Treatment and Safe Storage, Issue 2, May 2005, 10 pages.

Granite et al., "Novel Sorbents for Mercury Removal from Flue Gas", Ind. Eng. Chem. Res. 2000, 39, 1020-1029.

Granite et al., "Sorbents for Mercury Capture from Fuel Gas with Application to Gasification Systems", Ind. Eng. Chem. Res. 2006, 45, 4844-4848.

Granite et al., "Techniques for Mercury Control and Measurement in Gasification Systems", Presented at the 5th International Symposium on Gas Cleaning at High Temperature, Morgantown, WV, Sep. 2002, pp. 1-5.

Harck, "Arsenic in the US", Clean Water Filtration Systems, Jan. 2002, 42 pages.

Harper et al., "Removal of arsenic from wastewater using chemicalprecipitation methods", Water Environment Research, vol. 64, No. 3, 200-203.

Hayes et al., "The Phase Stability of Cerium Species in Aqueous Systems", Journal of the Electrochemical Society, 149 (12) C623-C630 (2002).

Hemmila et al., "Progree in Lanthanides as Luminscent Probes", Journal of Fluorescence, vol. 15, No. 4, Jul. 2005, 529-542.

Housecroft et al., "Inorganic Chemistry", 2001, Pearson Prentice Hall, chapter 7, pp. 170-186; chapter 14, pp. 338-344; Appendix 11, pp. 752-754; chapter 24, pp. 622-640.

Jadhav, "Development and Evaluation of Nanoscale Sorbents for Mercury Capture from Warm Fuel Gas", Aug. 25, 2006, 44 pages.

Johnston et al., "Safe Water Technology for Arsenic Removal", Technologies for Arsenic Removal from Drinking Water, pp. 1-22, date unknown.

Jones et al., "Arsenic 2000: An Overview of the Arsenic Issue in Bangladesh", Water Aid Bangladesh, Dec. 2000, pp. 1-70.

Kahakachchi et al., "Extraction of arsenic species from spiked soils and standard reference materials", Analyst 2004, 129, 714-718.

Kim et al., "Carbonate Effects in the Electrochemical Oxidation of Arsenite", Electrochemical Methods for Wastewater and Potable Water Treatment, Preprints of Extended Abstracts, vol. 42, No. 2, 2002.

Lambert, Human Health and Toxicology Information Sheet for Lanthanum Concentrate (5210/5212) and Lanthanum Lantanum Chloride (5240/5241), pp. 1-8, University of California, Irvine.

Link et al., "Inorganic Nanoparticles for Transfection of Mammalian Cells and Removal of Viruses from Aqueous Solutions", Biotechnology and Bioengineering, vol. 98, No. 5, Dec. 1, 2007, 1083-1093.

Lipps et al., "Arsenic Removal from Drinking Water by Adsorptive Media", U.S. EPA Demonstration Project at Spring Brook Mobile Home Park in Wales, ME, Six-Month Evaluation Report, Sep. 2006, 12 pages.

M. Jang et al., "Remediation of Arsenic-Contaminated Solids and Washing Effluents", Chemosphere, 60, pp. 344-354, (2005).

M.G.M. Alam et al., "Chemical Extraction of Arsenic from Contaminated Soil", J. Environ Sci Health a Tox Hazard Subst Environ Eng., 41 (4), pp. 631-643 (2006 ).

M.G.M. Alam et al., "Extraction of arsenic in a synthetic arsenic-contaminated soil using phosphate", Chemosphere 43 (2001) 1035-1041.

Murcott et al., "Innovative and Sustainable Technologies to Address the Global Arsenic Crisis", Sandia National Laboratories 2005 Vendor's Forum, Albuquerque, New Mexico, Nov. 2, 2005, 85 pages.

Mushak, "Potential Impact of Acid Precipitation on Arsenic and Selenium", Environmental Health Perspectives vol. 65, pp. 105-113, 1985.

Ohashi, "Arsenic removal technology—Arsenic removal using manganese oxide", available at http://www.apec-vc.or.jp/e/modules/tinyd00/index.php?id=64&kh_open_cid_00=7, accessed May 8, 2009, 5 pages.

Puraspec 1156 Mercury Removal, Johnson Matthey Catalysts 2003, 2 pages.

Puszynski et al., "Demonstration Project for Arsenic Removal from Drinking Water at Keystone, South Dakota", Mar. 15, 2005, 23 pages.

S.R. Al-Abed et al., "Arsenic Release from Iron Rich Mineral Processing Waste; Influence of pH and Redox Potential", Chemosphere, 66, pp. 775-782 (2007).

Shimoto, "Arsenic Removal Technology—Cerium adsorbent", available at http://wvvw.apec-vc.or.jp/e/modules/tinyd00/index.php?id=62&kh_open_cid_00=7, accessed May 8, 2009, 4 pages.

Smith et al., "American Rare Earth Minerals: The Indispensable Resource for Clean Energy Technologies", Molycorp Minerals, LLC, Prepared for Congressional Leaders Jan. 29, 2009, 21 pages.

Stiltner, "Mercury Removal from Natural Gas and Liquid Streams", 2001, UOP LLC, 10 pages.

Tannehill, "Naturally Occurring Arsenic and Mercury" Proceedings from the Seventy-Fifth Gas Processors Association Conference, May 2007, pp. 54-55.

Thill et al., "Cytotoxicity of CeO2 Nanoparticles for *Escherichia coli*. Physico-Chemical Insight of the Cytotoxicity Mechanism", Environ. Sci. Technol. 2006, 40, 6151-6156.

Tributyltin, available at http://pmep.cce.cornell.edu/profiles/extoxnet/pyrethrins-ziram/tributyltin-ext.html, accessed Jul. 3, 2008, 6 pages.

Vu et al., "Review of Arsenic Removal Technologies for Contaminated Groundwaters", Argonne National Laboratory, Apr. 2003, 41 pages.

Wasay et al., "Adsorption of fluoride, phosphate, and arsenate ions on lanthanum-impregnated silica gel", Water Environment Research, vol. 68, No. 3 (May-Jun. 1996), pp. 295-300.

Yates et al., "Kinetics of the Iodide-catalyzed Reaction between Cerium(IV) and Arsenic(III)", Jan. 19, 1956, Yale University.

Yotsumoto et al., "Latest functions and introduction cost of water treatment technique, Water treatment technique using cerium based adsorbent and examples", Plant and Process, vol. 47, No. 8, pp. 60-63 (2005), Japan.

Yu et al., "The Phase Stability of Cerium Species in Aqueous Systems", Journal of the Electrochemical Society, 153 (1) C74-C79 (2006).

Zhang et al., "Arsenate adsorption on an Fe-Ce bimetal oxide adsorbent : Role of surface properties", Jan. 1, 2005,Institute of Research and Innovation, Japan.

Zhou et al., "Cryptography based on the absorption/emission features of multicolor semiconductor nanocrystal quantum dots", Optics Express, Jun. 28, 2004, vol. 12, No. 13, 2925-2931.

International Search Report for International Application No. PCT/US08/81067, mailed Dec. 29, 2008.

Written Opinion for International Application No. PCT/US08/81067, mailed Dec. 29, 2008.

Baker et al., "Present General Status of Understanding of Heteroply Electrolytes and a Tracing of Some Major Highlights in the History of Their Elucidation", Chem. Rev., 1998, vol. 98, No. 1, pp. 3-50.

Chang, et al., "Wet air oxidation of a reactive dye solution using CoAlPO4 -5 and CeO2 catalysts", Chemosphere, Aug. 2003, vol. 52, No. 6, pp. 943-949.

Coronado et al., "Polyoxometalate-based Molecular Materials", Chem. Re., 1998, vol. 98, No. 1, pp. 273-296.

Fertonani et al., "Solid State Reactions of Mercury with Pure Noble Metals Part 2 Mercury iridium system", Journal of Thermal Analysis and Calorimetry, 2002, vol. 67, pp. 403-409.

Gouzerh et al., "Main-Group Element, Organic, and Organometallic Derivatives of Polyoxometalates", Chem. Re., 1998, vol. 98, No. 1, pp. 77-112.

Hakuta et al., "Production of Ultra-fine Ceria Particles by Hydrothermal Synthesis Under Supercritical Conditions ", Journal of Materials Science Letters, 1998, vol. 17, pp. 1211-1213.

Haron et al., "Sorption removal of arsenic by cerium-exchanged zeolite P", Materials Science and Engineering B, 2008, vol. 149, pp. 204-208.

Henderson, et al., "Redox properties of water on the oxidized and reduced surfaces of CeO2(111)", Surface Science, Feb. 20, 2003, vol. 526, Nos. 1-2, pp. 1-18, Environ. Molecular Sci. Lab., Pacific Northwest Nat. Lab., Richland, WA.

Hill, "Introduction: Polyoxometalates—Multicomponent Molecular Vehicles to Probe Fundamental Issues and Practical Problems", Chem. Re., 1998, vol. 98, No. 1, pp. 1-2.

Jeannin, "The Nomenclature of Polyoxometalates: How to Connect a Name and a Structure", Chem. Rev., 1998, vol. 98, No. 1, pp. 51-76.

Katsoulis, "A Survey of Applications of Polyoxometalates," Chem. Re., 1998, vol. 98, No. 1, pp. 359-388.

Klemperer et al., "Polyocoanion Chemistry Moves toward the Future: From Solids and Solutions to Surfaces," Chem. Re., 1998, vol. 98, No. 1, pp. 297-306.

Kozhevnikov, "Catalysis by Heteropoly Acids and Multicomponent Polyoxometalates in Liquid-Phase Reactions", Chem. Re., 1998, vol. 98, No. 1, pp. 171-198.

Lin, et al."Catalytic wet air oxidation of phenol by various CeO2 catalysts", Water Research, 2002, vol. 36, pp. 3009-3014.

Liu, et al. "Effect of CeO2 doping on catalytic activity of Fe2O3/gamma-AI2O(3) catalyst for catalytic wet peroxide oxidation of azo dyes", J. Hazard. Mater., May 8, 2007, vol. 143, Nos. 1-2, pp. 448-454, School of Municipal & Environmental Engineering, Harbin Institute of Technology, China.

Lopez-Anton, et al., "Retention of mercury in activated carbons in coal combustion and gasification flue gases", Fuel Processing Technology, Jun. 20, 2002, vol. 77-78, pp. 353-358.

Lowell et al., "Selection of Metal Oxides for Removing SO2 From Flue Gas", Ind. Eng. Chem. Proc. Des. Dev., 1971, vol. 10, No. 3, pp. 384-390.

Mizuno et al., "Heterogeneous Catalysis", Chem. Re., 1998, vol. 98, No. 1, pp. 199-218.

Muller et al., "Polyoxometalates: Very Large Clusters—Nanoscale Magnets", Chem. Re., 1998, vol. 98, No. 1, pp. 239-272.

Oztekin, "Recovery of Acides from Salt Forms", Desalinatio, 2007, vol. 212, pp. 62-69.

Peng et al., "Ceria nanoparticles supported on carbon nanotubes for the removal of arsenate from water", Materials Letters, 2005, vol. 59, pp. 399-403.

Portzer et al., "Development of novel sorbents for mercury control at elevated temperatures in coal-derived syngas: Results of initial screening of candidate materials", Fuel Process. Technol. 2004, vol. 85 pp. 621-630.

Rhule et al., "Polyoxometalates in Medicine," Chem. Re., 1998, vol. 98, No. 1, pp. 327-358.

Sadakane et al., "Electrochemical Properties of Polyoxometalates as Electrocatalysts", Chem. Re., 1998, vol. 98, No. 1, pp. 219-238.

Seida, et al., "Synthesis of clay-cerium hydroxide conjugates for the adsorption of Arsenic", Adsorption Science and Technology, Dec. 2005, vol. 23, No. 8, pp. 607-618.

Song, et al., "Mechanism of the Photocatalytic Degradation of C.I. Reactive Black 5 at pH 12.0 Using SrTiO3/CeO2 as the Catalyst", Environmental Science & Technology, 2007, vol. 41, No. 16, pp. 5846-5853, College of Biological and Environmental Engineering, China.

Song, et al., "Photocatalytic degradation of C.I. Direct Red 23 in aqueous solutions under UV irradiation using SrTiO3/CeO2 composite as the catalyst", Journal of Hazardous Materials, Apr. 15, 2008, vol, 152, No. 3, pp. 1301-1308, College of Biological and Environmental Engineering, China.

Spiro et al., J. Chem. Soc. 1965, 78-96.

Spotnitz, et al., "Mediated electrosynthesis with cerium (IV) in methanesulphonic acid", Journal of Applied Chemistry, Mar. 1990, vol. 20, No. 2, 209-215.

Trovarelli, "Cerium Dioxide : a key component in environmental catalysis", Rich Mac Magazine, La Chimica e L'Industria, Sep. 1996, vol. 78, pp. 823-829.

Weinstock, "Homogeneous-Phase Electron-Transfer Reactions of Polyoxometalates", Chem. Re., 1998, vol. 98, No. 1, pp. 113-170.

Worthington et al., "Kinetics and Analytical Applications of the Ruthenium Catalyzed Reaction between Cerium(IV) and Arsenic(III) in Sulferic Acid Medium", Analytical Chemistry, Sep. 1970, vol. 42, No. 11, pp. 1157-1164, Purdue University.

Yamase, "Photo- and Electrochromism of Polyoxometalates and Related Materials," Chem. Re., 1998, vol. 98, No. 1, pp. 307-326.

Yang et al., "Decontamination of Chemical Warfare Agents", Chem Rev., 1992, vol. 92, pp. 1729-1743.

U.S. Appl. No. 12/721,233, filed Mar. 10, 2010, Burba et al.

U.S. Appl. No. 12/725,114, filed Mar. 16, 2010, Whitehead et al.

U.S. Appl. No. 12/757,788, filed Apr. 9, 2010, Whitehead et al.

"NanoActive Cerium Oxide," NanoScale Corporation, NA106.v.3 Apr. 1, 2008, 2 pages.

"NanoActive Granules," NanoScale Corporation, available at http://www.nanoscalecorp.com/content.php/chemicals/granules/, printed Apr. 2, 2010, 2 pages.

"NanoActive Metal Oxides," NanoScale Corporation, available at http://www.nanoscalecorp.com/content.php/chemicals/home/, printed Apr. 2, 2010, 2 pages.

"NanoActive Powders," NanoScale Corporation, available at http://www.nanoscalecorp.com/content.php/chemicals/powders/, printed Apr. 2, 2010, 2 pages.

"NanoActive Suspensions," NanoScale Corporation, available at http://www.nanoscalecorp.com/content.php/chemicals/suspensions/, printed Apr. 2, 2010, 2 pages.

Australian Drinking Water Guidelines, H2O: Part V Facts Sheets, date unknown, 355 pages.

Cartwright, P.S., "A Residential Drinking Water Treatment Primer: Part 1," Water Conditioning and Purification, Feb. 2008, 6 pages.

Klabunde, K., "Overview of NanoScale: Its Technology and Capabilities," slideshow presentation by NanoScale, date unknown, 31 pages.

Pradeep, T., "Affordable clean water using nanotechnology," Indian Institute of Technology Madras, Potential Environmental Benefits of Nanotechnology: Fostering safe innovation-led growth, OECD Jul. 15-17, 2009, 58 pages.

Williams et al., "Drinking water: New disinfecting medium boosts water treatment," Filtration+Separation, Mar./Apr. 2010, pp. 16-19.

Youngran, J. et al., "Effect of competing solutes on arsenic (V) adsorption using iron and aluminum oxides," Journal of Environmental Sciences, vol. 19(8), 2007, pp. 910-919 (Abstract Only).

International Preliminary Report on Patentability for International (PCT) Patent Application No. PCT/US08/81067, mailed May 14, 2010.

U.S. Appl. No. 12/814,006, filed Jun. 11, 2010, Burba, III et al.

U.S. Appl. No. 12/814,032, filed Jun. 11, 2010, Burba, III et al.

U.S. Appl. No. 12/814,049, filed Jun. 11, 2010, Burba, III et al.

U.S. Appl. No. 12/831,054, filed Jul. 6, 2010, Hassler et al.

Cotton, "Modern inorganic chemistry," part 2, Moscow, World, 1969, pp. 202-203.

Sukharev, "Synthesis and use of specific oxyhydrate sorbents," Moscow, Energoatomizdat, 1987, pp. 75-102.

Youngran, J. et al., "Effect of competing solutes on arsenic (V) adsorption using iron and aluminum oxides," Journal of Environmental Sciences, vol. 19(8), 2007, pp. 910-919.

Firsching, "Solubility Products of the Trivalent Rare-Earth Arsenates," J. Chem. Eng. Data, 1992, vol. 37, pp. 497-499.

Firsching et al., "Solubility Products of the Trivalent Rare-Earth Phosphates," J. Chem. Eng. Data, 1991, vol. 36, pp. 93-95.

Jiang et al., "Biological nano-mineralization of Ce phosphate by Saccharomyces cerevisiae," Article in Press, Chemical Geology, 2010, vol. xxx, pp. xxx—xxx, 9 pages.

Nilchi et al., "Adsorption of selected ions on hydrous cerium oxide," Journal of Radioanalytical and Nuclear Chemistry, 2009, vol. 279(1), pp. 65-74.

Ho et al., "Removal of fluoride from water through ion exchange by mesoporous Ti oxohydroxide," Journal of Colloid and Interface Science, 2004, vol. 272, pp. 399-403.

Ishihara et al., "Pore size control for mesoporous titanium hydroxide prepared with mixed template molecules and its fluoride ion-exchange property," Microporous and Mesoporous Materials, 2009, vol. 122, pp. 87-92.

Official Action (English translation only) for Russian Patent Application No. 2008107341, dated Jun. 2, 2010.

U.S. Appl. No. 13/010,609, filed Jan. 20, 2011, Burba.

Dos Santos et al., "Review paper on current technologies for decolourisation of textile wastewaters: Perspectives for Anaerobic biotechnology," Bioresource Technology, 2007, vol. 98, pp. 2369-2385.

Gupta et al., "Novel Fluoropolymer-Based Striving for," www.PCIMAG.COM, Jul. 2007, pp. 70-80.

Kirk-Othmer, ed., "Colorants for Foods, Drugs, Cosmetics, and Medical Devices," Encyclopedia of Chemical Technology, Fourth Edition, vol. 6, 1998, John Wiley & Sons, pp. 892-941.

Kirk-Othmer, ed., "Dye Carriers," Encyclopedia of Chemical Technology, Fourth Edition, vol. 8, 1998, John Wiley & Sons, pp. 533-600.

U.S. Appl. No. 12/942,847, filed Nov. 9, 2010, Lupo et al.

"Distinguishing Adsorption and Surface Precipitation of Phosphate and Arsenate on Hydrous Iron Oxides," http://www.eng.nus.edu.sg/EResnews/0206/rd/rd__1.html, accessed Jul. 25, 2010, 4 pages.

Creaser et al., "X-ray photoelectron spectroscopic study of the oxidation and reduction of a cerium(III) oxide/cerium foil substrate," Catalysis Letters, 1994, vol. 23, pp. 13-24.

Heckert et al., "The role of cerium redox state in the SOD mimetic activity of nanoceria," Biomaterials, Jun. 2008, vol. 29, pp. 2705-2709.

Higuchi et al., "Electronic structure of protonic conductor $SrCeO_3$ by soft-X-ray spectroscopy," Solid State Ionics, Nov. 2004, vol. 175, pp. 549-552.

Li et al., "Synergism between rare earth cerium(IV) ion and vanillin on the corrosion of steel in $H_2SO_4$ solution: Weight loss, electrochemical, UV—vis, FTIR, XPS, and AFM approaches," Applied Surface Science, Jun. 2008, vol. 254, pp. 5574-5586.

Mullins et al., "Electron spectroscopy of single crystal and polycrystalline cerium oxide surfaces," Surface Science, Jul. 1998, vol. 409, pp. 307-319.

Raichur et al., "Adsorption of fluoride onto mixed rare earth oxides," Separation and Purification Technology, 2001, vol. 24, pp. 121-127.

Romeo et al, "XPS Study of the Reduction of Cerium Dioxide," Surface and Interface Analysis, May 1993, vol. 20, pp. 508-512.

Sharmin, "Arsenic Removal Processes on Trial in Bangladesh," Technologies for Arsenic Removal from Drinking Water, BUET-UNU International Workshop, Dhaka, Bangladesh, May 5-7, 2001, pp. 23-30.

Tahir, Muhammad Aslam, "Project-3: Innovative Low Cost Arsenic Removal Technologies," Thesis entitled Assessment of Arsenic and other Health Significant Water Quality Parameters in Ground Water of Northern Punjab, Department of Chemistry/ Bahauddin Zakariya University Multan, 2004, pp. 92-134.

Wakita et al., "A Synthetic Study of the Solid Solutions in the Systems $La_2(CO_3)_3 \times 8H_2O$-$CE_2(CO_3) \times H_2O$ and $La(OH)CO_3$-$CE(OH)CO_3$," Bulletin of the Chemical Society of Japan, 1979, vol. 52(2), pp. 428-432.

Yuliati et al., "Ce L[sub]III-edge XANES Study on Valence of alumina-supported cerium oxide," Photon Factory Activity Report 2004 #22 Part B, User's Report, 2005, pp. 56.

"APV Engineered Coatings Kynar®," Presentation by APV Engineered Coatings, http://www.apvcoatings.com/cms/resource_library/files/8537e627f567af63/kynar_presentation_weiss_inc_fiber_board_cement_pdf_.pdf, date unknown, 30 pages.

"Benchtop Granulator™ ," LCI Corporation Technical Bulletin TB-GR-101, 2004, http://replay.waybackmachine.org/20040518160414/http://www.Icicorp.com/granulation/Docs/benchtop_tb.pdf, 1 page.

"New Products Kynar Aquatec from Arkema Inc.," metalmag Magazine, posted May 28, 2009, 2 pages.

"Poly GoneLines," Schaner's Waste Water Products, Inc., available at http://www.struvite.com/products.html#polygone_lines, date unknown, 3 pages.

U.S. Appl. No. 13/086,247, filed Apr. 23, 2011, Hassler et al.

"Radial Xtruder® Model EXDCS-60," LCI Corporation Technical Bulletin, 2006, http://replay.waybackmachine.org/20060511144227/http://www.lcicorp.com/granulation/Docs/xtruder60G_%20tb.pdf, 2 pages.

"Twin Dome Extruder Model TDG-80G," LCI Corporation Technical Bulletin, 2006, http://replay.waybackmachine.org/20060511145629/http://www.lcicorp.com/granulation/Docs/tdg80_extruder_%20tb.pdf, 2 pages.

"Virus," Wikipedia the free encyclopedia, http://wn.wikipedia.org/w/index.php?title=Virus&printable=yes, last modified Mar. 16, 2009, 28 pages.

Filtronics "NXT-2 Adsorptive media for arsenic removal," at http://www.filtronics.com/nxt2.htm, date unknown, copyright 1998, 2008, 2 pages.

Kirk et al., "Pigments," Kirk-Othmer Encyclopedia of Chemical Technology, Fourth Edition, vol. 19, 1996, John Wiley & Sons, pp. 1-77.

Kroschwitz et al., eds., "Lanthanides," Kirk-Othmer Encyclopedia of Chemical Technology, Fourth Edition, vol. 14, 1995, John Wiley & Sons, pp. 1091-1115.

Press Release, "Arkema proudly announces a new water-based fluoropolymer platform: Kynar® Aquatec™," Arkema Inc., Jun. 26, 2006, available at http://www.arkemasalescorner.com/kynar.page.cfm?pag=985&PRR_ID=669, 1 page.

Press Release, "Kynar Aquatec® FMA Resins: Cool-Roof Coatings are Now Significantly Longer Lasting," Arkema Inc., Aug. 24, 2009, available at http://www.arkema-inc.com/index.cfm?pag-343&PRR, 1 page.

Qureshi et al., "Synthesis, Dehydration Studies, and Cation-Exchange Behavior of a New Phase of Niobium(V) Phosphate," Bull. Chem. Soc. Jpn., Oct. 1986, vol. 59, pp. 3247-3255.

Surasitani et al., "Kinetics of the Ruthenium-Catalyzed Arsenic (111)-Cerium(IV) Reaction," J. Phys. Chem., 1959, vol. 63(6), pp. 890-892.

Tu, C., "A Study of Availability of Soil Arsenic (in Chinese)" Journal of Southwest Agricultural University, Dec. 1992, vol. 14 (6), pp. 447 (includes English translation).

Yong et al., "Nitrogen and Phosphorous Removal in Municipal Wastewater Treatment Plants in China: A Review," International Journal of Chemical Engineering, accepted Apr. 26, 2010, 10 pages.

Official Action for Australian Patent Application No. 2008230064, dated Feb. 25, 2011.

U.S. Appl. No. 13/159,179, filed Jun. 13, 2001, Burba et al.

PhosGuard Product Description, at http://www.seachem.com/Products/product_pages/PhosGuard.html, copyright 2007-2011, 2 pages.

Product Sheet for FXPb1 Carbon Filters, Filtrex Technologies Pvt. Ltd, dated unknown, 2 pages.

Tokunaga et al., "Removal of fluoride ions from aqueous solutions by multivalent metal compounds," International Journal of Environmental Studies, 1995, vol. 48(1), pp. 17-28.

Magalhães, "Arsenic. An environmental problem limited by solubility," Pure Appl. Chem., 2002, vol. 74(10), pp. 1843-1850.

* cited by examiner

APPARATUS FOR TREATING A FLOW OF AN AQUEOUS SOLUTION CONTAINING ARSENIC

CROSS REFERENCE

This application claims the benefit of U.S. Provisional Patent Application Nos. 60/882,365, 60/882,376, and 60/882,401, each of which was filed on Dec. 28, 2006.

FIELD OF THE INVENTION

This invention relates generally to the removal of arsenic from aqueous solutions containing arsenic.

BACKGROUND OF THE INVENTION

The presence of arsenic in waters and other aqueous solutions or streams may originate from or have been concentrated through geochemical reactions, mining and smelting operations, the land-filling of industrial wastes, the disposal of chemical agents, as well as the past manufacture and use of arsenic-containing pesticides. Because the presence of high levels of arsenic may have carcinogenic and other deleterious effects on living organisms and because humans are primarily exposed to arsenic through drinking water, the U.S. Environmental Protection Agency (EPA) and the World Health Organization have set the maximum contaminant level (MCL) for arsenic in drinking water at 10 parts per billion (ppb). As a result, federal and state governments and utility districts require a simple, low cost method for removing arsenic from ground water and other sources of potable water. In addition, those active in industries such as mining, metal refining, steel manufacturing, glass manufacturing, chemical and petrochemical and power generation are looking to remove or reduce the amount of arsenic in their process streams, effluents and byproducts.

Arsenic can occur in the inorganic form in aquatic environments as the result of dissolution of solid phase arsenic such as arsenolite ($As_2O_3$), arsenic anhydride $As_2O_5$) and realgar ($AsS_2$). Arsenic can have four oxidation or valence states in water, i.e., −3, 0, +3, and +5. Under normal conditions, arsenic is typically found in such solutions in the +3 and +5 oxidation states, usually in the form of arsenite ($AsO_2^{-1}$) and arsenate ($As_4^{-3}$). The oxidation state has a significant impact on the ability to remove the arsenic from solution. For example, effective removal of arsenic by coagulation techniques requires that the arsenic be in the arsenate form. Arsenite, in which the arsenic exists in the +3 oxidation state, is only partially removed by adsorption and coagulation techniques because its main form, arsenious acid ($HAsO_2$), is a weak acid and remains un-ionized at pH levels between 5 and 8 at which adsorption is most effective.

Various technologies have been developed to remove arsenic from aqueous systems. Examples of such techniques include ion exchange with anion exchange resins, precipitation, electrodialysis, and adsorption on high surface area materials, such as alumina, activated carbon, various iron-containing compositions, lanthanum oxides and hydrous cerium dioxide. Some of these arsenic removal technologies have been made available commercially for point of entry systems, point of use and other small scale applications. However, such systems are focused on treating relatively small volumes of drinking water and are not suited or sufficiently robust for treating high volume industrial streams that can contain a diverse set of contaminants.

A simplified apparatus is needed that can be used to safely remove and dispose of arsenic from high volume aqueous streams and solutions that contain a diverse set of contaminants that may otherwise interfere with arsenic removal.

SUMMARY OF THE INVENTION

In one embodiment, the present invention provides an apparatus for treating a flow of an aqueous solution containing arsenic. The apparatus comprises a container that includes a housing having an inlet located at a first end and an outlet located at a second end opposite the first end, one or more outer walls extending between the first and second ends and enclosing a fluid flow path between the inlet and the outlet, and an arsenic fixing agent disposed within the housing in the fluid flow path for treating a flow of an aqueous solution containing arsenic.

Optionally, the housing can have a long axis and the fluid flow path between the inlet and the outlet can be parallel to the long axis of the housing along the length of the housing. In some embodiments, the housing has a long axis and at least a portion of the fluid flow path between the inlet and the outlet is not parallel to the long axis of the housing. The housing can be constructed from a material including one or more of a polyethylene, polyvinylchloride, acrylic, fiberglass, and concrete.

The apparatus can optionally include a manifold for providing fluid communication between the container and a source of the aqueous solution. In such an embodiment, the inlet can be adapted to be releasably connected to the manifold. The outlet can be adapted to be releasably connected to a manifold. The apparatus can also optionally include a heater in fluid communication with the inlet for heating the flow of an aqueous solution. The container can further include a heating jacket.

The first end can be elevated relative to the second end when receiving the flow of an aqueous solution. The inlet and the outlet of the container can be adapted to be closed during transport or storage of the container. The container can optionally include a filter in the fluid flow path downstream of the arsenic fixing agent. The filter, when present, can include a bed of particulate matter such as a bed that includes diatomaceous earth.

The arsenic fixing agent can optionally include an insoluble rare earth-containing compound. In some embodiments, the insoluble rare earth-containing compound comprises one or more of cerium, lanthanum, or praseodymium. More specifically, the insoluble rare earth-containing compound can include a cerium-containing compound derived from one or more of thermal decomposition of a cerium carbonate or a cerium oxalate, and precipitation of a soluble cerium salt. More specifically still, the insoluble rare earth-containing compound can include a cerium oxide. In some embodiments, the arsenic fixing agent consists essentially of one or more cerium oxides, and optionally, one or more of a binder and flow aid.

The container can be adapted to be sealed for disposal. In some embodiments, the arsenic fixing agent is spaced apart from the inlet defining a space between the inlet and the arsenic fixing agent that can be filled with a sealant to seal the container for disposal. Optionally, the arsenic fixing agent can be spaced apart from the outlet defining a space between the outlet and the arsenic fixing agent that can be filled with a sealant to seal the container for disposal. The arsenic fixing agent can also be spaced apart from the outer wall to define a space between the outer wall and the arsenic fixing agent that can be filled with a sealant to seal the container for disposal.

In such embodiments, the container can further include a port for introducing a sealant into the space between the outer wall and the arsenic fixing agent. When the container includes a filter in the fluid flow path downstream of the arsenic fixing agent, the filter can be spaced apart from the outlet defining a space between the filter and the outlet that can be filled with a sealant to seal the container for disposal.

In a process aspect, the invention provides a process for removing arsenic from an aqueous solution and disposing of same. The process includes providing an apparatus for use in treating a flow of an aqueous solution containing arsenic. The apparatus comprises a container that includes a housing having a first end and a second end opposite the first end and an inlet and an outlet. An outer wall extends between the first and second ends enclosing a fluid flow path between the inlet and the outlet. An arsenic fixing agent is disposed within the housing in the fluid flow path for treating a flow of an aqueous solution through the container. The arsenic fixing agent is spaced apart from one or more of the inlet, the outlet and the outer wall to define one or more spaces between the arsenic fixing agent and the inlet, between the arsenic fixing agent and the outlet, and between the arsenic fixing agent and the outer wall. After the arsenic fixing agent has been exposed to a flow of an aqueous solution containing arsenic, the process further includes introducing a sealant into the one or more spaces between the arsenic fixing agent and the inlet, between the arsenic fixing agent and the outlet, and between the arsenic fixing agent and the outer wall to seat the housing for disposal.

BRIEF DESCRIPTION OF THE DRAWINGS

The invention may be understood by reference to the following description taken in conjunction with the accompanying drawings.

Figure 1:
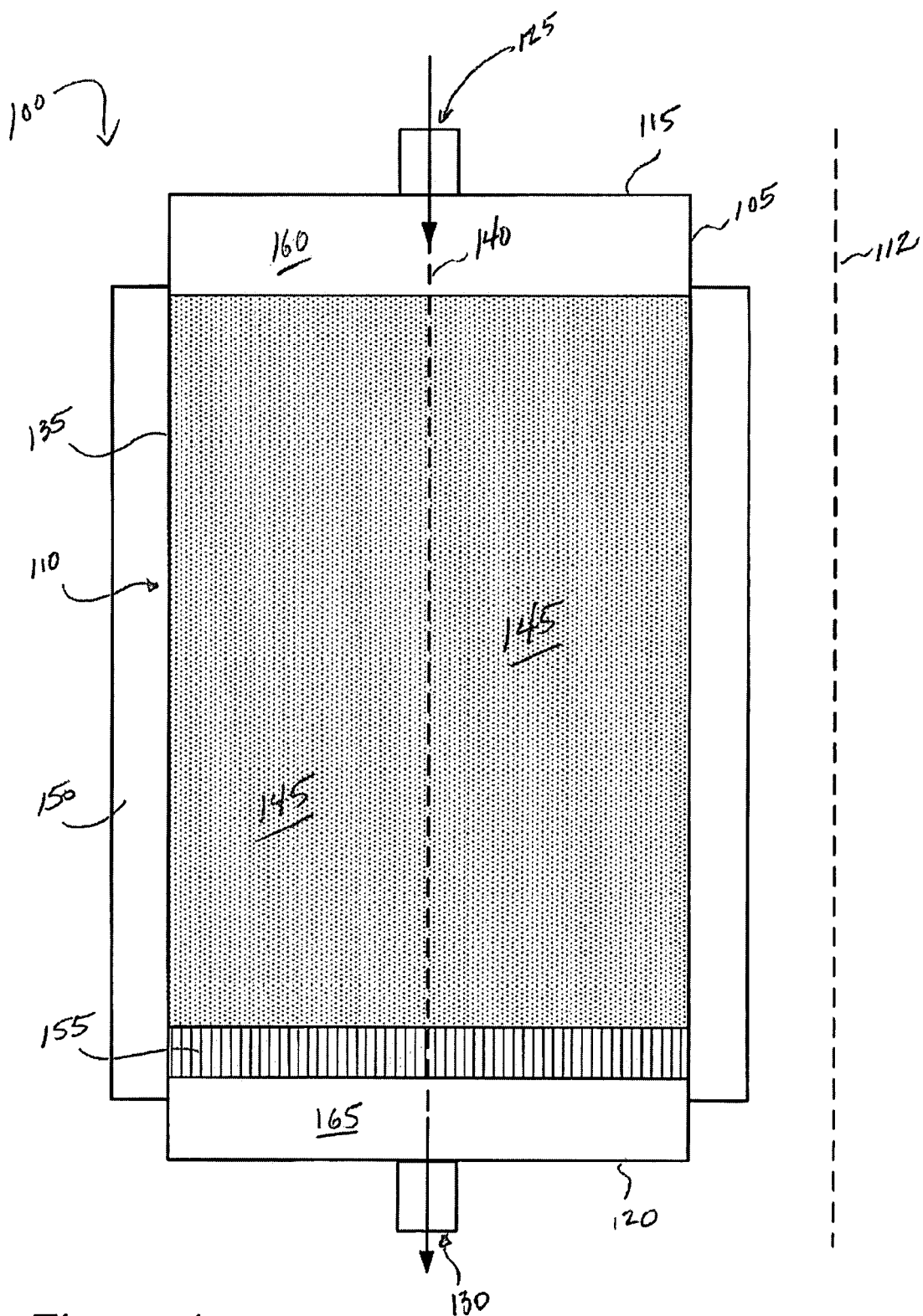
FIG. 1 is a cross sectional view of an embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Illustrative embodiments of the invention are described below. In the interest of clarity, not all features of an actual embodiment are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover it will be appreciated that such a development effort might be complex and time-consuming, but would nevertheless be a routine undertaking for those of ordinary skill in the art having the benefit of this disclosure.

As used herein, "one or more of" and "at least one of" when used to preface several elements or classes of elements such as X, Y and Z or $X_1$-$X_n$, $Y_1$-$Y_n$ and $Z_1$-$Z_n$, is intended to refer to a single element selected from X or Y or Z, a combination of elements selected from the same class (such as $X_1$ and $X_2$), as well as a combination of elements selected from two or more classes (such as $Y_1$ and $Z_n$).

It will be understood that an apparatus and process as described herein can be used to treat any aqueous solution that contains an undesirable amount of arsenic. Examples of such solutions can include process streams, byproducts and waste materials from industries such as mining, metal refining, steel manufacturing, glass manufacturing, chemical and petrochemical, as well as solutions produced from treating or remediating contaminated soils, wastewater sludge, and the like. Specific examples of arsenic-bearing materials can include mine tailings, mats and residues from industrial processes, soils contaminated by effluents and discharges from such processes, spent catalysts, and sludge from wastewater treatment systems. While portions of the disclosure herein refer to the removal of arsenic from mining tailings and residues from hydrometallurgical operations, such references are illustrative and should not be construed as limiting.

Aqueous solutions containing arsenic can also contain other inorganic contaminants, such as selenium, cadmium, lead, mercury, chromium, nickel, copper and cobalt, and organic contaminants. The disclosed apparatus and process can remove arsenic from such materials even when elevated concentrations of such inorganic contaminants are present. More specifically, arsenic can be effectively removed from solutions prepared from such arsenic-bearing materials that comprise more than about 1000 ppm of inorganic sulfates. Arsenic-containing solutions can also contain particularly high concentrations of arsenic. Solutions prepared from such materials can contain more than about 20 ppb arsenic and frequently contain in excess of 1000 ppb arsenic. The disclosed apparatus and process are effective in decreasing such arsenic levels to amounts less than about 20 ppb, in some cases less than about 10 ppb, in others less than about 5 ppb and in still others less than about 2 ppb.

The disclosed apparatus and process are also able to effectively fix arsenic from solutions over a wide range of pH levels, as well as at extreme pH values. In contrast to many conventional arsenic removal techniques, this capability eliminates the need to alter and/or maintain the pH of the solution within a narrow range when removing arsenic. Moreover, where the aqueous solution is produced from the remediation of an arsenic-bearing material, it adds flexibility because the selection of materials and processes for leaching arsenic from an arsenic-bearing material can be made without significant concern for the pH of the resulting arsenic-containing solution. Further still, elimination of the need to adjust and maintain pH while fixing arsenic from an arsenic-containing solution provides significant cost advantages.

In one aspect of the present invention, an apparatus is provided for treating a flow of an aqueous solution containing arsenic. The apparatus comprises a container that includes a housing having an inlet located at a first end and an outlet located at a second end opposite the first end. One or more outer walls extend between the first and second ends enclosing a fluid flow path between the inlet and the outlet. An arsenic fixing agent is disposed within the housing in the fluid flow path for treating a flow of an aqueous solution containing arsenic.

The container can comprise a variety of vessels such as a tank, reactor, filter, filter bed, drum, cartridge, or other vessel suitable for allowing an aqueous solution to flow therethrough while holding the arsenic fixing agent in place. Suitable containers can be prepared from metals, polymers, fiberglasses, concrete and like materials. In some embodiments, depending on the components of the aqueous solution and/or its pH, the container can have only non-metallic materials into contact with the solution. Specific non-limiting examples of such materials can include one or more of polyethylene, polyvinylchloride, acrylic, fiberglass, and concrete.

The container has an inlet that is in fluid communication with a source of the aqueous solution to be treated. The apparatus can include a manifold upstream of the container inlet for providing fluid communication between the container and the source of the aqueous solution and controlling the flow of that solution. The inlet can be adapted to be releasably connected to the manifold such as by having quick connect-disconnect features. Similarly, the outlet of the container can be adapted to be releasably connected to a manifold downstream of the container. In a specific embodiment, the inlet, outlet and any additional ports on the container can be adapted to be closed during transport, handling or storage of the container. Such closures can include a valve incorporated into an inlet or outlet or may simply be threads or similar features for mating with a cap, bung or other closure means that is to be temporarily or permanently attached to the container.

The container can include a filter in the fluid flow path downstream of the arsenic fixing agent. As used herein, "downstream" and "upstream." are used in reference to the direction of the flow of aqueous solution through the container. The filter can include any filter element that is known in the art for solid-liquid separation and can be made from any material suitable for the conditions of use and the composition of the aqueous solution to be treated. In one embodiment, the filter comprises a bed of particulate matter downstream of the arsenic fixing agent. In a more specific embodiment, the particulate matter comprises a bed of diatomaceous earth.

The container can take a variety of sizes and shapes depending on the desired flow properties of the aqueous solution through a given arsenic fixing agent. Such shapes can include one or more of cylindrical, conical, bi-conical, hemispherical, trumpet, bell-shaped, hyperboloid, and parabolic among others.

The container can have a long axis along its longest dimension with the inlet and the outlet positioned at opposite ends of the long axis. In such an embodiment, the fluid flow path between the inlet and the outlet can be parallel to the long axis along the entire length of the container. In an alternative embodiment, at least a portion of the fluid flow path between the inlet and the outlet is not parallel to the long axis such as with a serpentine fluid flow path or a cross flow-type flow path. In some embodiments, the container will have an aspect ratio, the ratio of its longer dimension to its shorter dimension, that is greater than about 1, and in some cases that is greater than about 1.5. In a particular embodiment, the container is greater than about 0.75 meters in length.

Although the selected arsenic fixing agent should be capable of fixing arsenic from the aqueous solution at ambient temperatures, it has been found that the capacity of arsenic fixing agents that comprise insoluble rare earth-containing compounds to remove and/or adsorb arsenic from the aqueous solution can be increased by increasing the temperature of the system. As a result, the container can be provided with a heating jacket or other heating means for maintaining the container and the arsenic fixing agent at a desired temperature. In an alternative embodiment the apparatus can include a heater upstream of and in fluid communication with the container inlet for heating a flow of aqueous solution to a desired temperature.

The container can be adapted to be sealed for disposal. When the arsenic fixing agent has been exposed to an arsenic containing solution and is at least partially saturated with arsenic, the flow of solution can be discontinued. A flow of air or other gas can optionally be directed through the container to evaporate residual solution and dry the arsenic fixing agent. In one embodiment, the arsenic fixing agent is spaced apart from the inlet so as to define a space between the inlet and the arsenic fixing agent that can be filled with a sealant to seal the container. In another embodiment, the arsenic fixing agent is spaced apart from the outlet defining a space between the outlet and the arsenic fixing agent that can be filled with a sealant to seal the container. In embodiments where the container includes a filter in the fluid flow path downstream of the arsenic fixing agent, the filter is spaced apart from the outlet so as to define a space between the filter and the outlet that can be filled with a sealant to seal the container. In yet another embodiment, the arsenic fixing agent is spaced apart from the outer wall defining a space between the outer wall and the arsenic fixing agent that can be filled with a sealant to seal the container. The sealant can be introduced into the container either through the inlet or the outlet. In some embodiments, the container will include one or more ports for the purpose of introducing a sealant into the space between the outer wall and the arsenic fixing agent or one of the other spaces described herein. Suitable sealants can include the materials used in the manufacture of the container or any other material that will provide a durable seal about the arsenic fixing agent. In a particular embodiment, a cement or concrete will be pumped into the spaces of the container and allowed to cure.

When installed and receiving a flow of the aqueous solution, the first end of the container can be elevated relative to the second end. In some embodiments, such as where pumps are used to control a flow of aqueous solution through the arsenic fixing agent, other orientations of the container may be preferred. As a result, the solution can flow through the container under the influence of gravity, pressure or other means, with or without agitation or mixing. Various fittings, connections, pumps, valves, manifolds, and the like can be used to control the flow of an aqueous solution into the container and through the arsenic fixing agent.

The arsenic fixing agent can be any insoluble rare earth-containing compound that is effective at fixing arsenic in solution through precipitation, adsorption, ion exchange or other mechanism. As used herein, "insoluble" is intended to refer to materials that are insoluble in water, or at most, are sparingly soluble in water under standard conditions of temperature and pressure.

In some embodiments, the fixing agent has a relatively high surface area of at least about 70 $m^3/g$, and in some cases more than about 80 $m^3/g$, and in still other cases more than 90 $m^3/g$. The fixing agent can be substantially free of arsenic prior to contacting the arsenic-containing solution or can be partially-saturated with arsenic. When partially-saturated, the fixing agent can comprise between about 0.1 mg and about 80 mg of arsenic per gram of fixing agent.

The fixing agent can include one or more of the rare earths including lanthanum, cerium, praseodymium, neodymium, promethium, samarium, europium, gadolinium, terbium, dysprosium, holmium, erbium, thulium, ytterbium and lutetium. Specific examples of such materials that have been described as being capable of removing arsenic from aqueous solutions include trivalent lanthanum compounds (U.S. Pat. No. 4,046,687), soluble lanthanide metal salts (U.S. Pat. No. 4,566,975), lanthanum oxide (U.S. Pat. No. 5,603,838), lanthanum chloride (U.S. Pat. No. 6,197,201), mixtures of lanthanum oxide and one or more other rare earth oxides (U.S. Pat. No. 6,800,204), cerium oxides (U.S. Pat. No. 6,862,825); mesoporous molecular sieves impregnated with lanthanum (U.S. Patent Application Publication No. 20040050795), and polyacrylonitrile impregnated with lanthanide or other rare earth metals (U.S. Patent Application Publication No. 20050051492). It should also be understood that such rare earth-containing fixing agents may be obtained from any source known to those skilled in the art.

In an embodiment where the insoluble rare earth-containing compound comprises a cerium-containing compound, the cerium-containing compound can be derived from precipitation of a cerium salt. In another embodiment, an insoluble cerium-containing compound can be derived from a cerium carbonate or a cerium oxalate. More specifically, a high surface area insoluble cerium-containing compound can be prepared by thermally decomposing a cerium carbonate or oxalate at a temperature between about 100° C. and about 350° C. in a furnace in the presence of air. The temperature and pressure conditions may be altered depending on the composition of the cerium containing starting material and the desired physical properties of the insoluble rare earth-containing compound. The reaction may be summarized as:

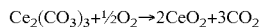

$$Ce_2(CO_3)_3 + \tfrac{1}{2}O_2 \rightarrow 2CeO_2 + 3CO_2$$

The product may be acid treated and washed to remove remaining carbonate. Thermal decomposition processes, for producing cerium oxides having various features are described in U.S. Pat. No. 5,897,675 (specific surface areas), U.S. Pat. No. 5,994,260 (pores with uniform lamellar structure) U.S. Pat. No. 6,706,082 (specific particle size distribution), and U.S. Pat. No. 6,887,566 (spherical particles), and such descriptions are incorporated herein by reference. Cerium carbonate and materials containing cerium carbonate are commercially available and may be obtained from any source known to those skilled in the art.

In embodiments where the insoluble rare earth-containing compound comprises a cerium oxide, the insoluble rare earth-containing compound can include a cerium oxide such as $CeO_2$. In such an embodiment, it is generally preferred to use solid particles of cerium oxide, which are insoluble in water and relatively attrition resistant. In a more particular embodiment, the arsenic fixing agent consists essentially of one or more cerium oxides, and optionally, one or more of a binder and flow aid.

Optionally, a fixing agent that does not contain an insoluble rare earth compound can also be used in the described apparatus and process. Such optional fixing agents can include any solid, liquid or gel that is effective at fixing arsenic in solution through precipitation, adsorption, ion exchange or some other mechanism. These optional fixing agents can be soluble, slightly soluble or insoluble in the aqueous solution. Optional fixing agents can include particulate solids that contain cations in the +3 oxidation state that react with the arsenate in solution to form insoluble arsenate compounds. Examples of such solids include alumina, gamma-alumina, activated alumina, acidified alumina such as alumina treated with hydrochloric acid, metal oxides containing labile anions such as aluminum oxychloride, crystalline alumino-silicates such as zeolites, amorphous silica-alumina, ion exchange resins, clays such as montmorillonite, ferric salts, porous ceramics. Optional fixing agents can also include calcium salts such as calcium chloride, calcium hydroxide, and calcium carbonate, and iron salts such as ferric salts, ferrous salts, or a combination thereof. Examples of iron-based salts include chlorides, sulfates, nitrates, acetates, carbonates, iodides, ammonium sulfates, ammonium chlorides, hydroxides, oxides, fluorides, bromides, and perchlorates. Where the iron salt is a ferrous salt, a source of hydroxyl ions may also be required to promote the co-precipitation of the iron salt and arsenic. Such a process and materials are described in more detail in U.S. Pat. No. 6,177,015, issued Jan. 23, 2001 to Blakey et al. Other optional fixing agents are known in the art and may be used in combination with the rare earth-containing fixing agents described herein. Further, it should be understood that such optional fixing agents may be obtained from any source known to those skilled in the art.

To promote interaction of the insoluble rare earth-containing compound with arsenic in solution, the insoluble rare earth-containing compound can comprise aggregated particulates having a mean surface area of at least about 1 $m^2/g$. Depending upon the application, higher surface areas may be desired. Specifically, the particulates can have a surface area of at least about 5 $m^2/g$, in other cases more than about 10 $m^2/g$, and in still other cases more than about 25 $m^2/g$. Where higher surface areas are desired, the particulates can have a surface area of more than about 70 $m^2/g$, in other cases more than about 85 $m^2/g$, in still other cases more than 115 $m^2/g$, and in yet other cases more than about 160 $m^2/g$. In addition, it is envisioned that particulates with higher surface areas will be effective. One skilled in the art will recognize that the surface area of the insoluble rare earth-containing compound will impact the fluid dynamics of the solution. As a result, one may need to balance benefits that are derived from increased surface areas with disadvantages such as pressure drop that may occur.

A polymer binder can optionally be used to bind the insoluble, rare earth-containing compound into aggregated particulates having desired size, structure, density, porosity and fluid properties. In some embodiments, the polymer binder can comprise one or more of fibers, particulates, aggregates of fibers and or particulates, and mixtures of the same. A suitable polymer binder can include any polymeric material that will bind and/or support the fixing agent under conditions of use. Suitable polymeric binders will include both naturally occurring and synthetic polymers, as well as synthetic modifications of such polymers. One skilled in the art will recognize that the selection of the polymer binder material will depend on such factors as the composition components, their properties and binding characteristics, the characteristics of the final composition and the intended conditions of use.

In general, polymers melting between about 50° C. and about 500° C., more particularly, between about 75° C. and about 350° C., even more particularly between about 80° C. and about 200° C., are suitable for use in forming aggregates. Non-limiting examples can include polyolefins that soften or melt in the range from about 85° C. to about 180° C., polyamides that soften or melt in the range from about 200° C. to about 300° C., and fluorinated polymers that soften or melt in the range from about 300° C. to about 400° C. The melting point of the polymer binder will preferably not exceed the sintering temperature of the selected fixing agent.

Such polymer materials will generally be included in amounts ranging from about 0 wt % to about 90 wt %, based upon the total weight of the binder and fixing agent. In some embodiments, the polymer binder will be present in an amount less than about 15% by weight of the composition. More specifically, the polymer binder may be less than about 10%, and in other embodiments, less than about 8% by weight of the composition.

Depending upon the desired properties of the composition, polymer binders can include one or more polymers generally categorized as thermosetting, thermoplastic, elastomer, or a combination thereof as well as cellulosic polymers and glasses. Suitable thermosetting polymers include, but are not limited to, polyurethanes, silicones, fluorosilicones, phenolic resins, melamine resins, melamine formaldehyde, and urea formaldehyde. Suitable thermoplastics can include, but are not limited to, nylons and other polyamides, polyethylenes, including LDPE, LLDPE, HDPE, and polyethylene copolymers with other polyolefins, polyvinylchlorides (both plasticized and unplasticized), fluorocarbon resins, such as polytetrafluoroethylene, polystyrenes, polypropylenes, cellulosic resins such as cellulose acetate butyrates, acrylic resins, such as polyacrylates and polymethylmethacrylates, thermoplastic blends or grafts such as acrylonitrile-butadiene-styrenes or acrylonitrile-styrenes, polycarbonates, polyvinylacetates, ethylene vinyl acetates, polyvinyl alcohols, polyoxymethylene, polyformaldehyde, polyacetals, polyesters, such as polyethylene terephthalate, polyether ether ketone, and phenolformaldehyde resins, such as resols and novolacs. Suitable elastomers can include, but are not limited to, natural and/or synthetic rubbers, like styrene-butadiene rubbers, neoprenes, nitrile rubber, butyl rubber, silicones, polyurethanes, alkylated chlorosulfonated polyethylene, polyolefins, chlorosulfonated polyethylenes, perfluoroelastomers, polychloroprene (neoprene), ethylene-propylene-diene terpolymers, chlorinated polyethylene, fluoroelastomers, and ZALAK™ (Dupont-Dow elastomer). Those of skill in the art will realize that some of the thermoplastics listed above can also be thermosets depending upon the degree of cross-linking, and that some of each may be elastomers depending upon their mechanical properties. The categorization used above is for ease of understanding and should not be regarded as limiting or controlling.

Cellulosic polymers can include naturally occurring cellulose such as cotton, paper and wood and chemical modifications of cellulose.

Polymer binders can also include glass materials such as glass fibers, beads and mats. Glass solids may be mixed with particulates of an insoluble rare earth-containing compound and heated until the solids begin to soften or become tacky so that the insoluble rare earth-containing compound adheres to the glass. Similarly, extruded or spun glass fibers may be coated with particles of the insoluble rare earth-containing compound while the glass is in a molten or partially molten state or with the use of adhesives. Alternatively, the glass composition may be doped with the insoluble rare earth-containing compound during manufacture. Techniques for depositing or adhering insoluble rare earth-containing compounds to a substrate material are described in U.S. Pat. No. 7,252,694 and other references concerning glass polishing. For example, electro-deposition techniques and the use of metal adhesives are described in U.S. Pat. No. 6,319,108 as being useful in the glass polishing art. The descriptions of such techniques are incorporated herein by reference.

The insoluble rare earth-containing compound may optionally be combined with one or more flow aids, with or without a binder. Flow aids can be used to improve the fluid dynamics of a solution over or through the arsenic fixing agent, to prevent separation of components, prevent the settling of fines, and in some cases to hold the fixing agent and other components in place. Suitable flow aids can include both organic and inorganic materials. Inorganic flow aids can include ferric sulfate, ferric chloride, ferrous sulfate, aluminum sulfate, sodium aluminate, polyaluminum chloride, aluminum trichloride, silicas, diatomaceous earth and the like. Organic flow aids can include organic flocculents known in the art such as polyacrylamides (cationic, nonionic, and anionic), EPI-DMA's (epichlorohydrin-dimethylamines), DADMAC's (polydiallydimethyl-ammonium chlorides), dicyandiamide/formaldehyde polymers, dicyandiamide/amine polymers, natural guar, etc. When present, the flow aid can be mixed with the insoluble rare earth-containing compound and polymer binder during the formation of the aggregate composition. Alternatively, particulates of the aggregate composition and of the flow aid can be mixed to yield a physical mixture with the flow aid dispersed uniformly throughout the mixture. In yet another alternative, the flow aid can be disposed in one or more distinct layers upstream and downstream of the fixing agent containing composition. When present, flow aids are generally used in low concentrations of less than about 20%, in some cases less than 15%, in other cases less than 10%, and in still other cases less than about 8% by weight of the fixing agent containing composition.

Other optional components can include various inorganic agents including ion-exchange materials such as synthetic ion exchange resins, activated carbons, zeolites (synthetic or naturally occurring), minerals and clays such as bentonite, smectite, kaolin, dolomite, montmorillinite and their derivatives, metal silicate materials and minerals such as of the phosphate and oxide classes. In particular, mineral compositions containing high concentrations of calcium phosphates, aluminum silicates, iron oxides and/or manganese oxides with lower concentrations of calcium carbonates and calcium sulfates are suitable. These materials may be calcined and processed by a number of methods to yield mixtures of varying compositions.

In another embodiment, a process is provided for removing arsenic from an aqueous solution and disposing of same. The process includes providing an apparatus for use in treating a flow of an aqueous solution containing arsenic. The apparatus includes a container comprising a housing having a first end and a second end opposite the first end and an inlet and an outlet. An outer wall extends between the first and second ends enclosing a fluid flow path between the inlet and the outlet. An arsenic fixing agent as described herein is disposed within the housing in the fluid flow path for treating a flow of an aqueous solution along the fluid flow path. The arsenic fixing agent is spaced apart from one or more of the inlet, the outlet and the outer wall to define one or more spaces between the arsenic fixing agent and the inlet, between the arsenic fixing agent and the outlet, and between the arsenic fixing agent and the outer wall.

After the arsenic fixing agent has been exposed to a flow of an aqueous solution containing arsenic, a sealant is introduced into the one or more spaces between the arsenic fixing agent and the inlet, between the arsenic fixing agent and the outlet, and between the arsenic fixing agent and the outer wall to seal the housing for disposal.

DETAILED DESCRIPTION OF THE FIGURES

FIG. 1 is a cross sectional view of an apparatus 100 that includes container 105. As illustrated, container 105 includes housing 110 that has first end 115 and second end 120. Outer wall 135 extend between the first and second ends and enclose fluid flow path 140 between inlet 125 and outlet 130. Arsenic fixing agent 145 is disposed within housing 110 in fluid flow path 140. Container 105 and housing 110 have a long axis which is indicated at the side by broken line 112. As illustrated, fluid flow path 140 is parallel to the long axis of housing 110.

Housing 110 has heating jacket 150 for heating the container and the arsenic fixing agent.

Filter 155 is provided downstream of arsenic fixing agent 145 to hold the fixing agent in place and to prevent the passage of fines and other particulates out of container 105. Filter 155 is a bed of diatomaceous earth.

Fixing agent 145 is spaced apart from inlet 125 with open space 160 defined there between. Similarly, filter 155 is spaced apart from outlet 130 with open space 165 defined therebetween. When the container is ready for disposal, spaces 160 and 165 can be filled with a sealant such as concrete for encasing the arsenic-bearing fixing agent.

Figure 2:
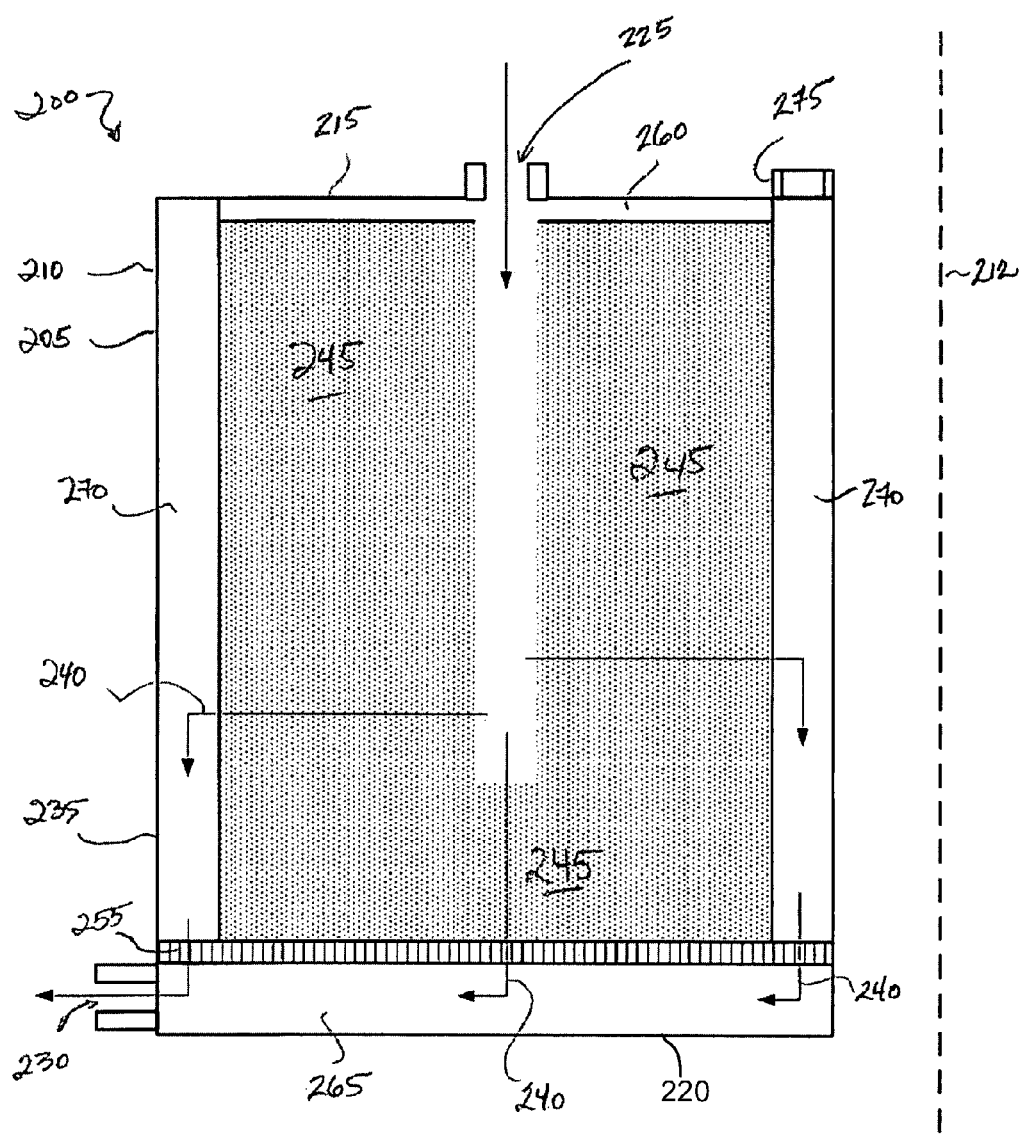
FIGS. 2 and 3 are cross sectional views of an apparatus for illustrating a process of the present invention.
Figure 3:
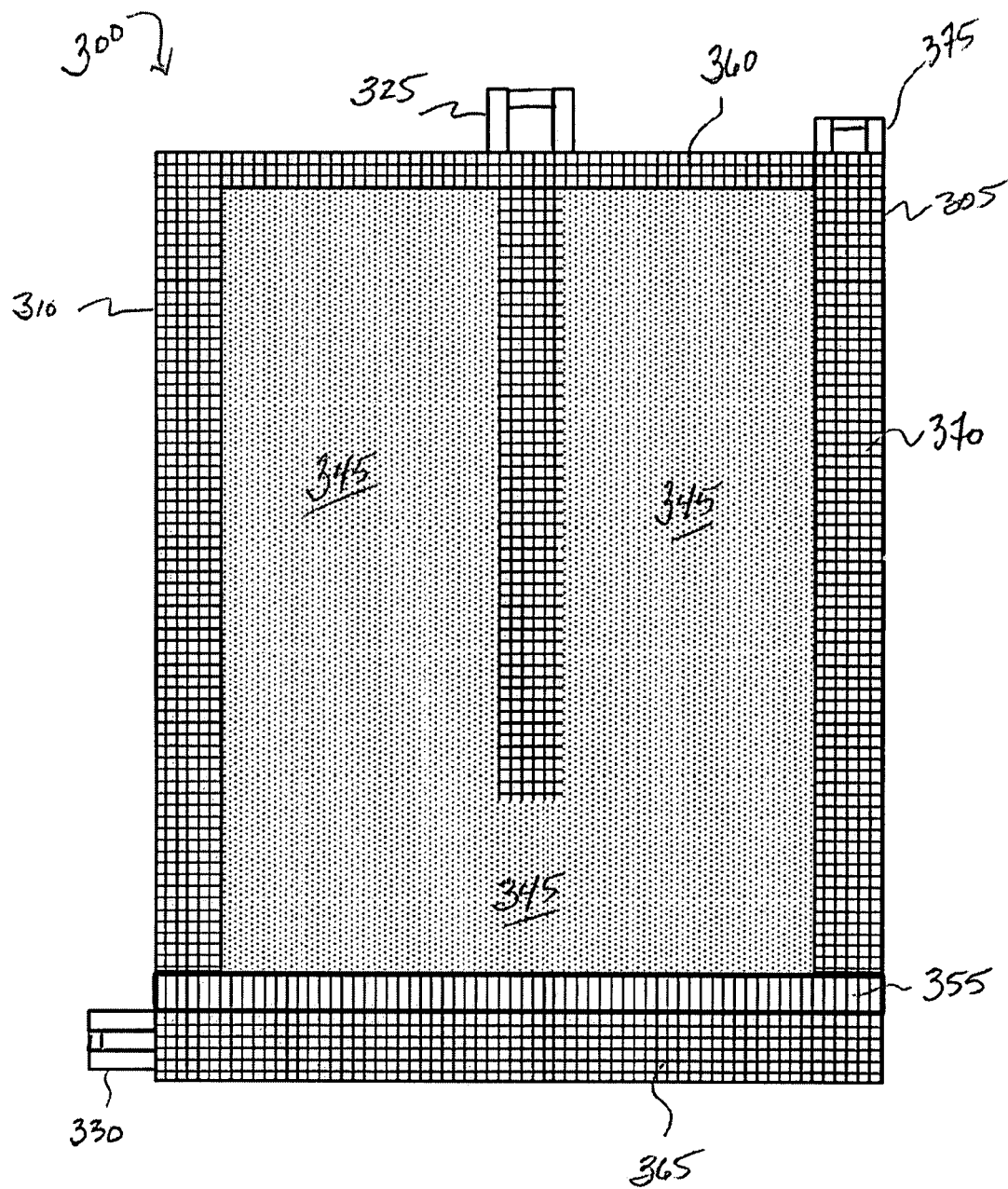

FIGS. 2 and 3 illustrate apparatuses 200 and 300, respectively, at different stages of the described process. In addition, apparatus 200 differs from apparatus 100 in the location of outlet 230 and because a portion of fluid flow path 240 is not parallel to the long axis of housing 210. Apparatus 200 includes container 205, which has housing 210. Housing 210 includes first end 215 and second end 220. Outer wall 235 extend between the first and second ends and enclose fluid flow path 240 between inlet 225 and outlet 230. Arsenic fixing agent 245 is disposed within housing 210 and is in the form of a cross-flow type filter. The aqueous solution flows down into a central cavity and then flows either down or outwardly through the fixing agent. The treated solution then flows out into space 270 between the fixing agent and outer wall 235, and down through filter element 255 into space 265.

Apparatus 200 and apparatus 300 are intended to be substantially the same with container 205 in condition for use in removing arsenic from an aqueous solution and container 305 having been sealed for disposal. More specifically, when the fixing agent is saturated with arsenic or otherwise ready for disposal, the spaces 260, 265 and 270 can be filled with a suitable sealant, such as cement, to seal the container 205. Such a sealed container is illustrated in FIG. 3, wherein spaces 360, 365 and 370 have been filled with cement as illustrated by cross hatching. Port 375 is provided on housing 310 for introducing cement into space 370 about arsenic fixing agent 345. The cement is introduced into space 360 via inlet 325 and into space 365 via outlet 330. Also as shown, once spaces 360, 365 and 370 are filled, port 375, inlet 325 and outlet 330 can be capped or bunged.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A container adapted for treating an aqueous solution containing arsenic, the container comprising:
   sealant introduction means for introducing, after removing the arsenic from the aqueous solution, a sealant into one or more spaces of the container;
   a housing having an inlet located at a first end and an outlet located at a second end opposite the first end, one or more outer walls extending between the first and second ends enclosing a fluid flow path between the inlet and the outlet; and
   an insoluble rare earth-containing arsenic fixing agent disposed within the housing in the fluid flow path for treating a flow of the aqueous solution containing arsenic, wherein the arsenic fixing agent is spaced apart from at least one of the inlet, outlet and the outer walls to define the one or more spaces, the one or more spaces are positioned between the arsenic fixing agent and the at least one of the inlet, outlet and the outer walls, the one or more spaces adapted for receiving the sealant and sealing the container for disposal after substantially removing the arsenic from the aqueous solution.

2. The container of claim 1, wherein the housing further comprises a long axis and the fluid flow path between the inlet and the outlet is parallel to the long axis.

3. The container of claim 1, wherein the housing further comprises a long axis and at least a portion of the fluid flow path between the inlet and the outlet is not parallel to the long axis.

4. The container of claim 1, wherein the first end is elevated relative to the second end when treating the flow of the aqueous solution containing arsenic.

5. The container of claim 1, wherein the container further comprises a heating jacket.

6. The container of claim 1, further comprising a manifold for providing fluid communication between the container and a source of the aqueous solution.

7. The container of claim 6, wherein the inlet is adapted to be releasably connected to the manifold.

8. The container of claim 1, wherein the outlet is adapted to be releasably connected to a manifold.

9. The container of claim 1, wherein the inlet and the outlet are adapted to be closed during transport or storage of the container and wherein the one or more spaces adapted for receiving the sealant is the space between the arsenic fixing agent and the outer walls and wherein the space between the arsenic fixing agent and the outer walls is filled with a flowable sealant to seal the container, after use, for disposal.

10. The container of claim 9, wherein the container further comprises a filter in the fluid flow path downstream of the arsenic fixing agent and wherein the filter is positioned between the arsenic fixing agent and the one or more spaces adapted for receiving the sealant.

11. The container of claim 10, wherein the filter comprises a bed of particulate matter and wherein the sealant is a cement or concrete.

12. The container of claim 11, wherein the particulate matter comprises diatomaceous earth and wherein the arsenic fixing agent has a surface area of at least about 70 $m^2/g$.

13. The container of claim 9, wherein the container comprises a port in fluid communication with the one or more spaces adapted for receiving the sealant, whereby the sealant can fill the one or more spaces.

14. The container of claim 1, wherein the insoluble rare earth-containing compound comprises one or more of cerium, lanthanum, praseodymium, neodymium, erbium, promethium, samarium, europium, gadolinium, terbium, dysprosium, holmium, erbium, thulium, ytterbium and lutetium.

15. The container of claim 1, wherein the arsenic fixing agent is in the form of a particulate, wherein the particulate comprises a polymer binder having a melting temperature between about 50 to about 500° C., and wherein the particulate comprises less than about 15% by weight of the binder.

16. The container of claim 1, wherein the insoluble rare earth-containing compound comprises a cerium oxide.

17. The container of claim 16, wherein the arsenic fixing agent consists essentially of one or more cerium oxides, and one or more of a binder and a flow aid.

18. The container of claim 1, wherein the housing comprises one or more of a polyethylene, polyvinylchloride, acrylic, fiberglass, and concrete.

19. The container of claim 1, further comprising a heater in fluid communication with the inlet for heating the flow of the aqueous solution.

20. The container of claim 1, wherein the one or more spaces adapted for receiving the sealant is a space between the arsenic fixing agent and the inlet and wherein the space between the arsenic fixing agent and the inlet is filled with sealant.

21. The container of claim 1, wherein the one or more spaces adapted for receiving the sealant is a space between the arsenic fixing agent and the outlet and wherein the space between the arsenic fixing agent and the outlet is filled with sealant.

22. The container of claim 1, wherein the one or more spaces adapted for receiving the sealant is a space between the arsenic fixing agent and the outer walls and wherein the space between the arsenic fixing agent and the outer walls is filled with sealant.

23. The container of claim 22, the housing further comprises a port for introducing a sealant into the space between the outer wall and the arsenic fixing agent.

24. The container of claim 1, further comprising a filter in the fluid flow path downstream of the arsenic fixing agent, wherein the filter is spaced apart from the outlet.

25. An apparatus, comprising:
   a housing having a first end and a second end opposite the first end and an inlet and an outlet, wherein the inlet and the outlet are adapted to be closed during transport or storage of the container;
   an outer wall extending between the first and second ends enclosing a fluid flow path between the inlet and the outlet;
   arsenic fixing means comprising an insoluble rare earth compound disposed within the housing in the fluid flow path for removing at least most arsenic from a flow of an aqueous solution along the fluid flow path and forming a treated aqueous solution, wherein the arsenic fixing means is spaced apart from one or more of the inlet, the outlet and the outer wall to define one or more spaces between the arsenic fixing means and the inlet, between the arsenic fixing means and the outlet, and between the arsenic fixing means and the outer wall, the one or more spaces being a part of the fluid flow path; and
   sealant introduction means for introducing, after the arsenic fixing means has been exposed to a flow of the aqueous solution containing arsenic, a sealant into the one or more spaces between the arsenic fixing means and the inlet, between the arsenic fixing means and the outlet, and between the arsenic fixing means and the outer wall to seal the housing for disposal.

* * * * *